(12) United States Patent
Wu et al.

(10) Patent No.: US 12,190,065 B1
(45) Date of Patent: Jan. 7, 2025

(54) PROACTIVE SUPPLEMENTAL CONTENT OUTPUT

(71) Applicant: Amazon Technologies, Inc., Seattle, WA (US)

(72) Inventors: Felix Xiaomeng Wu, Seattle, WA (US); Manish Dutt Sharma, Sammamish, WA (US); Ye He, Bellevue, WA (US); Jiang Xiang, Bellevue, WA (US); Rongzhou Shen, Kirkland, WA (US); Philippe Di Cristo, Redmond, WA (US)

(73) Assignee: Amazon Technologies, Inc., Seattle, WA (US)

(*) Notice: Subject to any disclaimer, the term of this patent is extended or adjusted under 35 U.S.C. 154(b) by 509 days.

(21) Appl. No.: 17/357,174

(22) Filed: Jun. 24, 2021

(51) Int. Cl.
G06F 40/35 (2020.01)
G06N 20/00 (2019.01)
(Continued)

(52) U.S. Cl.
CPC .......... G06F 40/35 (2020.01); G06N 20/00 (2019.01); *G10L 13/02* (2013.01); *G10L 15/08* (2013.01);
(Continued)

(58) Field of Classification Search
CPC .... G06F 40/35; G06F 16/9535; G06F 16/954; G06F 16/951; G06F 16/338; G06F 16/285; G06F 16/90332; G10L 13/02; G10L 15/08; G10L 15/16; G10L 15/183; G10L 15/187; G10L 15/1822; G10L 15/1815; G10L 15/1807; G10L 15/18; G10L 15/22; G10L 15/2212; G10L 15/225; G10L 15/227; G10L 15/228; G10L 15/26; G10L 25/84; G10L 2015/088; G06N 20/00; G06N 5/048; G06Q 30/02; G06Q 10/10; G06Q 10/02; G06Q 10/109; G06Q 10/107; G06Q 20/384
(Continued)

(56) References Cited

U.S. PATENT DOCUMENTS 9,262,751 B1* 2/2016 Wheeler ............... H04L 51/216
2015/0312632 A1* 10/2015 Hoctor ................ H04N 21/462
725/14
(Continued)

*Primary Examiner* — Leshui Zhang
(74) *Attorney, Agent, or Firm* — Pierce Atwood LLP

(57) ABSTRACT

Techniques for filtering the output of supplemental content are described. When a supplemental output system (e.g., a supplemental content system or notification system) receives supplemental content for output, the supplemental output system sends a user identifier (of the recipient user) and the supplemental content to separately implemented filtering component. The filtering component uses a machine learning (ML) model to determine a topic of the supplemental content. The filtering component determines whether the supplemental content should not be output based on the ML model-determined topic, one or more guardrail policies of the supplemental output system, and user frustration data regarding previously output supplemental content. Use of the ML model to determine the topic prevents a content publisher from surreptitiously associating supplemental content with a specific topic in an effort to bypass topic-based output guardrails.

20 Claims, 11 Drawing Sheets

(51) Int. Cl.
  *G10L 13/02* (2013.01)
  *G10L 15/08* (2006.01)
  *G10L 15/22* (2006.01)
  *G10L 25/84* (2013.01)
(52) U.S. Cl.
  CPC ........ *G10L 2015/088* (2013.01); *G10L 15/22* (2013.01); *G10L 25/84* (2013.01)
(58) Field of Classification Search
  USPC .... 704/1–9, 200, 200.1, 202, 231, 232, 235, 704/246, 251; 706/15, 22, 23, 25, 45, 46, 706/47, 50, 51, 52, 55, 60, 62
  See application file for complete search history.

(56) References Cited

U.S. PATENT DOCUMENTS

| | | | | |
|---|---|---|---|---|
| 2017/0293615 | A1* | 10/2017 | Peterson | G06F 40/30 |
| 2020/0356531 | A1* | 11/2020 | Fox | G06F 16/358 |
| 2021/0211479 | A1* | 7/2021 | Trim | H04L 65/80 |
| 2021/0234816 | A1* | 7/2021 | Zong | G06V 30/19173 |

* cited by examiner

PROACTIVE SUPPLEMENTAL CONTENT OUTPUT

BACKGROUND

Natural language processing systems have progressed to the point where humans can interact with and control computing devices using their voices. Such systems employ techniques to identify the words spoken by a user based on the various qualities of received input data. Speech recognition combined with natural language understanding processing techniques enable speech-based user control of computing devices to perform tasks based on the spoken inputs. Speech recognition and natural language understanding processing techniques are sometimes referred to collectively or separately as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
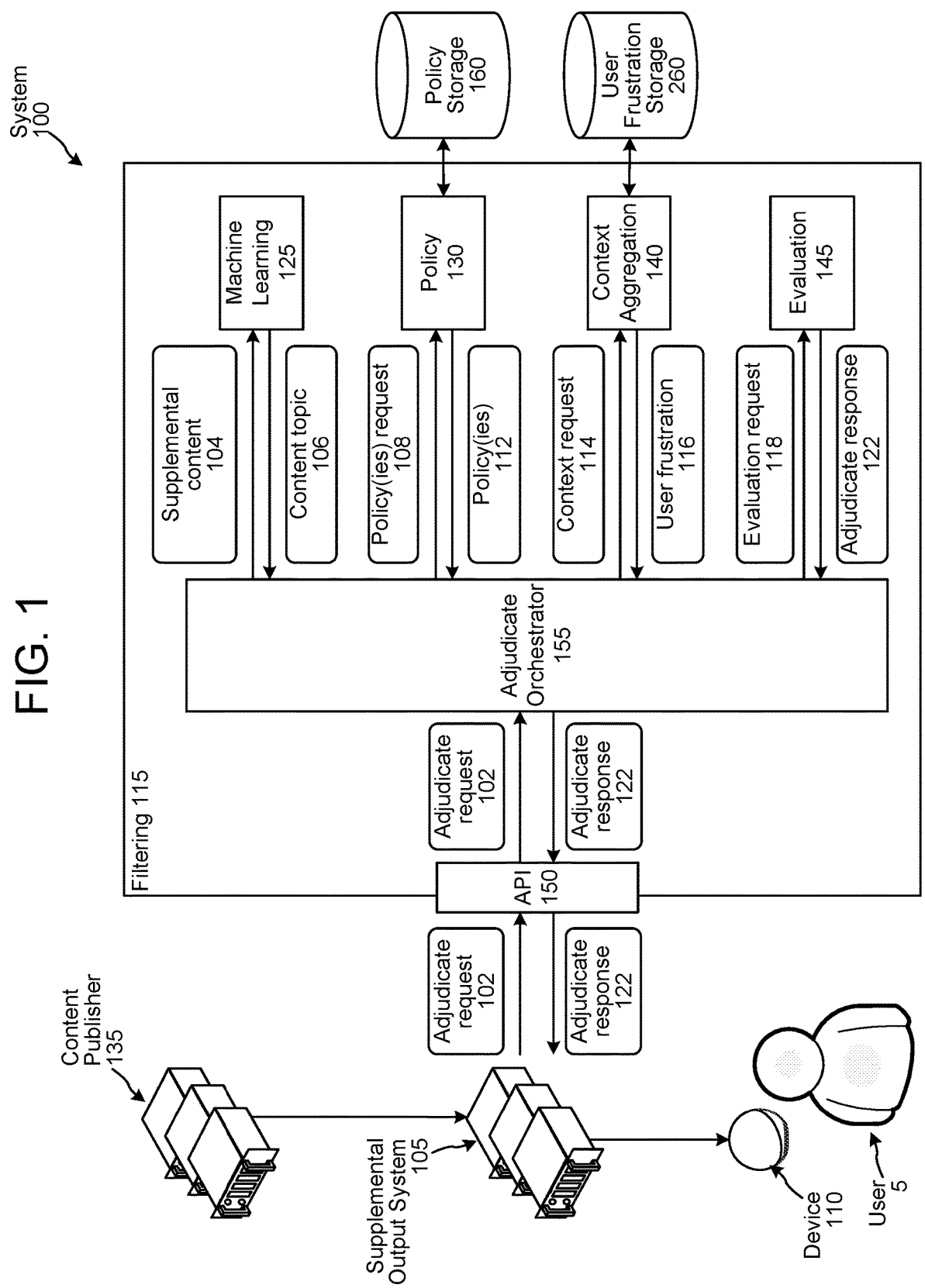
FIG. 1 is a conceptual diagram illustrating a system configured to filter supplemental content outputs, according to embodiments of the present disclosure.

A system may proactively generate and output content to a user thereof. Such content may not be responsive to a user input (e.g., a spoken natural language input) received by the system, and may be referred to as "supplemental content." The supplemental content may be output in addition to or otherwise to supplement an output that is responsive to a user input. The supplemental content may be related to or may be unrelated to the output that is responsive to the user input. As used herein, "content" refers to synthesized speech, displayed text, an image(s), a video, a displayed graphical user interface (GUI) element, or the like that is output to and perceivable by a user.

The system may include and/or communicate with one or more supplemental output systems configured to proactively output supplemental content to users of the system. For example, the system may include or otherwise be in communication with a supplemental content system and a notification system.

The supplemental content system, for example, may proactively output supplemental content to a user at the end of a dialog. The supplemental content system may proactively output supplemental content that is may be inferred content. As used herein, "inferred content" refers to content that is generated in anticipation of a user's needs, without the user explicitly requesting the specific content be generated, to inform the user about information that may be important/useful/relevant to the user. For example, the supplemental content system may output inferred content generated based on an electronic "wishlist" that was manually created by the user or that may be based on the historical purchases of the user, and the inferred content may recommend a product (good or service) the user may be interested in purchasing. For further example, the supplemental content system may output inferred content informing a user of a new feature/functionality, of a system, related to a subject/topic/item the user has expressed an affinity for in the past.

As used herein, a "dialog" refers to an exchange of related user inputs and system-generated responses. A dialog may be goal-oriented, meaning the dialog is directed to the performance of a specific action (e.g., figuring out what music the system should play). A user input and performance of a corresponding action (i.e., a system-generated response), may be referred to as a dialog "turn." A dialog identifier may be associated with multiple related turns corresponding to consecutive related user inputs and system outputs. Each turn may be associated with a respective turn identifier. One user input may be considered related to a subsequent user input, thereby causing a single dialog identifier to be associated with both user inputs. A first user input may be considered related to a second (subsequent) user input based on, for example, a length of time between receipt of the first and second user inputs, a length of time between performance of a system-generated response to the first user input and receipt of the second user input, the substances of the first and second user inputs, and/or the substances of the second user input and the system-generated response to the first user input. In some embodiments, the supplemental content system may output inferred content upon determining, or otherwise being notified that, a dialog has ended.

The notification system may proactively output requested content, and may optionally output inferred content in some embodiments. As used herein, "requested content" refers to content that a user explicitly subscribed to receive. For example, a user may subscribe to receive severe weather alerts for a geographic location, notifications that items ordered from an online store have been delivered, new message notifications (e.g., from a particular sender), notifications when the user's food orders are ready for pickup, notifications of upcoming calendar events, notifications for sporting events' score updates, notifications indicating when taxis have arrived to pick up the user, etc.

The notification system may indicate content is available for output prior to outputting the content to the user. For example, the notification system may indicate content is available for output by causing a device to activate a light indicator (e.g., a light ring, light emitting diode (LED), etc.) in a particular manner (e.g., exhibit a particular color, blink in a particular manner, etc.). For further example, the notification system may indicate content is available for output by causing a device (e.g., a smart phone, tablet, smart television, or other device including or being associated with a display) to display a GUI element, such as a banner, a card, or the like. As another example, the notification system may indicate content is available for output by causing a device (e.g., a smart watch, smart ring, or smart phone) to vibrate in a particular manner (e.g., at a particular vibration strength, particular vibration pattern, etc.) or by causing a device to output a sound (e.g., a chime, etc.). A mechanism to indicate content is available for output may be referred to as a "notification." As such, the foregoing activation of the light indicator in the particular manner, display of the GUI element, and device vibration may be individually or collectively referred to as a "notification."

The system may limit the output of certain content topics in certain situations. For example, the system may only allow certain content topics (e.g., high priority content topics such as a motion detected topic, door unlocked topic, etc.) to be output regardless of a time of day when the corresponding content is received for output, while preventing output of content for other topics during night time.

A content publisher may indicate a content topic, of requested or inferred content, when the content publisher provides the content to a supplemental output system for output. Knowing that the system may be configured to limit or otherwise filter the output of certain content topics, a content publisher may label content with a particular content topic in an effort to bypass the system's filtering mechanisms. For example, a content publisher may label shopping recommendation content as being of a motion detected topic in order to get the system to output the shopping recommendation content regardless of a time of day when the shopping recommendation content is received for output.

The present disclosure provides techniques for filtering output of supplemental content to minimize a likelihood that a user will be provided with unbeneficial content. In some embodiments, the system may include a filtering component that processes supplemental content using a machine learning (ML) component to determine a content topic for the content. The filtering component may thereafter determine whether the content should be output based on the ML component-determined content topic, one or more policies, and/or user frustration associated with content that was previously output for the user.

By using the ML component-determined content topic to determine whether content is to be proactively output, rather than using a content topic provided by a publisher of the content, the filtering component is able to better ensure that a user is not provided with undesirable content, thus resulting in an improved user experience.

The filtering component, in some embodiments, may be shared among various supplemental output systems of the system. That is, the supplemental output system may be called to process, for example as described above, with respect to various supplemental output systems. Such enables the system to filter supplemental content in a centralized manner, preventing the need for each supplemental output system to be uniquely configured to filter supplemental content.

A system according to the present disclosure may be configured to incorporate user permissions and may only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 shows a system 100 configured to filter supplemental content outputs, according to embodiments of the present disclosure. Although the figures and discussion of the present disclosure illustrate certain processes in a particular order, the processes described may be performed in a different order (as well as certain processes removed or added) without departing from the present disclosure.

The system 100 may include a device 110 (local to a user 5), a content publisher 135, a supplemental output system 105, and a filtering component 115 in communication across a network(s) 199. The network 199 may include the Internet and/or any other wide- or local-area network, and may include wired, wireless, and/or cellular network hardware.

As used herein, a "content publisher" refers to a computing system or component configured to send content to one or more supplemental output systems of the system 100. In some instances, a content publisher may be a skill. As used herein, a "skill" refers to software, that may be placed on a machine or a virtual machine (e.g., software that may be launched in a virtual instance when called), configured to process data representing a user input and perform one or more actions in response thereto. In some instances, a skill may process NLU output data to perform one or more actions responsive to a user input represented by the NLU output data. What is described herein as a skill may be referred to using different terms, such as a processing component, an application, a bot, or the like.

The content publisher 135 sends supplemental output data to the supplemental output system 105. The supplemental output data may include, for example, a content publisher identifier uniquely identifying the content publisher 135 from other content publishers. In the situation where the content publisher 135 is a skill, the content publisher identifier may be a skill identifier. The supplemental output data also includes supplemental content (e.g., inferred content or requested content). For example, the supplemental content may be natural language (e.g., text) data that is to undergo text-to-speech (TTS) processing to generate a synthesized speech output. Non-limiting examples of supplemental content include "it may be time for you to re-order your laundry detergent," "I have a new skill available, want to hear about it," "your meeting with John is starting in 15 minutes," "you received an email from Jane 2 minutes ago," "the Seahawks game is starting in 30 minutes," "it will start raining in about 45 minutes," "a red sedan, having license plate [license plate number], from [taxi service name] will be arriving in about 3 minutes at [address]," "your dish soap order is expected to be delivered in about 45 minutes," and "the news will begin in 10 minutes."

In some embodiments, the supplemental output data may also include a content topic determined by the content publisher 135 to represent the supplemental content. Example content topics include, but are not limited to, shopping, new feature/functionality, upcoming meeting, new email, sporting event update, weather update, taxi arrival, product delivery, etc.

The present disclosure is not limited to any particular supplemental output system 105. Non-limiting examples of the supplemental output system 105 include a notification system 400 (described in detail with respect to FIGS. 5-7) and a supplemental content system 300 (described in detail with respect to FIG. 3).

In response to receiving the supplemental output data from the content publisher 135, the supplemental output system 105 sends an adjudicate request 102 to the filtering component 115 to determine whether the supplemental output system 105 should output the supplemental content to the intended recipient user 5. The request may include, for example, the supplemental output data and a user identifier of the user 5 (determined by a user recognition component 795 described with respect to FIG. 7). As illustrated in FIG. 1, the supplemental output system 105 may send the adjudicate request 102 to an application programming interface (API) 150 of the filtering component 115.

In general, the adjudicate request 102 may request the filtering component 115 to make a determination as to whether supplemental content should be/can be output for a particular recipient user. The adjudicate request 102 may include, for example, an identifier of the supplemental output system 105, a case identifier to track processing with respect to whether the supplemental content is to be output, an identifier of the content publisher 135 that provided the supplemental content to the supplemental output system 105, a content identifier corresponding to the supplemental content, the supplemental content (e.g., represented in natural language data), and a user identifier corresponding to the user to receive the supplemental content. In some embodiments, the adjudicate request 102 may include an intent of a more recent user input received from the intended recipient user.

The filtering component 115 may include an adjudicate orchestrator component 155 configured to coordinate data transmissions to facilitate processing of the filtering component 115 to determine whether supplemental content should be output. Upon receiving the adjudicate request 102, the adjudicate orchestrator component 155 may send the supplemental content 104 (as represented in the adjudicate request 102) to a ML component 125. For example, the supplemental content 104 may be natural language (e.g., text) data.

The ML component 125 is configured to process the supplemental content 104 (e.g., natural language data) to determine a content topic 106 representing the supplemental content. Example content topics include, but are not limited to, shopping, new feature/functionality, upcoming meeting, new email, sporting event update, weather update, taxi arrival, product delivery, etc.

As indicated above, in some situations the supplemental output data may include a content topic as determined by the content publisher 135. The purpose of the ML component 125 is to determine a content topic 106 that most accurately represents the supplemental content 104, regardless of what the content publisher 135 indicated the content topic of the supplemental content 104 to be. Thus, the ML component 125 may function to prevent the content publisher 135 from intentionally or unintentionally labeling supplemental content 104 with an incorrect content topic.

The ML component 125 provides machine understanding of what the supplemental content 104 represents, thereby negating the need to rely on a content topic as provided by the content publisher 135 of the supplemental content 104. As described below, the content topic 106, as determined by the ML component 125, may be used to perform further processing to determine whether the supplemental content 104 should be output to the user.

In some embodiments, the ML component 125 may process with respect to every supplemental content input to the filtering component 115 via the API 150. In some embodiments, the ML component 125 may only process with respect to some of the supplemental content input to the filtering component 115 (e.g., only supplemental content not associated with a content topic as provided by a content publisher 135, only supplemental content provided by an "untrusted" content publisher 135 (e.g., a content publisher 135 associated with a rating or other metric failing to satisfy a condition (e.g., a threshold rating or other metric)), etc.). The rating of a content publisher may be determined based on user feedback received from various users (associated with various user identifiers) of the system 100 with respect to the content publisher.

In some embodiments, the ML component 125 may determine one or more other metadata, for the supplemental content 104, than just the content topic 106. Such depends on how the ML component 125 is trained.

The ML component 125 is not limited to any particular training technique or configuration, as different training techniques and configurations are beneficial in different circumstances. The ML component 125 may run one or more ML models. The ML model(s) run by the ML component 125 may be trained and operated according to various ML techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply ML techniques, ML processes themselves need to be trained. Training a ML component 125 may require establishing a "ground truth" for training examples. In ML, the term "ground truth" refers to the accuracy of a training set's classification for supervised learning techniques. Various techniques may be used to train the models including backpropagation, statistical learning, supervised learning, semi-supervised learning, stochastic learning, or other known techniques.

In some embodiments, the ML component 125 may be trained using examples of supplemental content manually annotated to indicate a respective content topic. Such enables the ML component 125 to receive the supplemental content 104 and determine the content topic 106 at runtime.

The adjudicate orchestrator component 155 also sends a policy (ies) request 108 to the policy component 130. The policy (ies) request 108 includes the identifier of the supplemental output system 105 and, optionally, the content topic 106 determined by the ML component 125. Thus, the policy (ies) request 108 may request one or more policies for outputting of the supplemental content 104 based on the identifier of the supplemental output system 105 and/or one or more policies for outputting of the supplemental content 104 based on the identifier of the supplemental output system 105 and the content topic 106.

The policy component 130 may communicate with a policy storage 160 that, generally, stores policies indicating when supplemental content should not be output. For example, a policy, associated with an identifier of the notification system 400, may indicate a device should not indicate supplemental content is available (e.g., via activation of a light indicator, display of a GUI element, vibration, etc.) during a particular time period (e.g., from 10 pm to 5 am). For further example, a policy associated with either an identifier of the notification system 400 or the supplemental content system 300, may indicate a maximum frequency (i.e., maximum number of times within a certain time period) that supplemental content may be output to a user using either the notification system 400 or the supplemental content system 300. In another example, a policy, associated with an identifier of the supplemental content system 300, may indicate a minimum amount of time (e.g., at least 30 minutes) that should elapse between instances of the supplemental content system 300 outputting supplemental content to a single user. For further example, a policy, associated with either an identifier of the notification system 400 or the supplemental content system 300, may indicate supplemental content should only be output using a particular device or device type. In another example, a policy, associated with either an identifier of the notification system 400 or the supplemental content system 300, may indicate supplemental content should only be output when the user/device is at or near a particular location (e.g., the user's home). It will be appreciated that the foregoing policies are illustrative, and the present disclosure is not limited to the specific example policies provided.

The policy component 130 queries the policy storage 160 for policies associated with the supplemental output system identifier, and optionally the content topic 106. In response, the policy component 130 receives one or more policies 112, which the policy component 130 sends to the adjudicate orchestrator component 155.

The adjudicate orchestrator component 155 also sends a context request 114 to a context aggregation component 140. In general, the context request 114 requests user frustration data representing user frustration exhibited by the user (intended to receive the supplemental content 104) with respect to previously output supplemental content corresponding to the content topic 106 (determined by the ML component 125) and/or the content publisher 135 that provided the supplemental content 104. The context request 114 may include an identifier of the supplemental output system 105, the user identifier of the user intended to receive the supplemental content 104, the content topic 106, a content identifier corresponding to the supplemental content 104, and/or an identifier of the content publisher 135 that provided the supplemental content 104.

In response to receiving the context request 114, the context aggregation component 140 queries a user frustration storage 260 (illustrated in and described with respect to FIG. 2) for user frustration data associated with the various data represented in the context request 114 (e.g., the identifier of the supplemental output system 105, the user identifier of the user intended to receive the supplemental content 104, the content topic 106, the content identifier corresponding to the supplemental content 104, and/or the identifier of the content publisher 135 that provided the supplemental content 104). In response, the context aggregation component 140 may receive one or more instances of user frustration data 116 associated with the user identifier, the supplemental output system identifier, and one or more of the content topic 106, the content identifier corresponding to the supplemental content 104, and/or the identifier of the content publisher 135 that provided the supplemental content 104. In some embodiments, an instance of user frustration data 116 may include an intent representing a user input that was received prior to supplemental content being output. In some instances, the context aggregation component 140 may not receive user frustration data in response to querying the user frustration storage 260 (e.g., in situations where the user has not previously provided negative user feedback with respect to the data represented in the context request 114). In instances where more than one user frustration storage is implemented, with each corresponding to a different supplemental output system, the context aggregation component 140 may determine a user frustration storage associated with the identifier of the supplemental output system 105 and specifically query that storage for the user frustration data.

After receiving the content topic 106, the one or more policies 112, and the user frustration data 116, the adjudicate orchestrator component 155 sends an evaluation request 118 to the evaluation component 145. The evaluation request 118 may include, for example, the user identifier of the user intended to receive the supplemental content 104, the supplemental content 104, the one or more policies 112, and the user frustration data 116. If a policy, in the one or more policies 112, indicates supplemental content should not be output, or should only be output, during certain times of day, the evaluation request 118 may include a time zone of the user 5 and/or present time of day information. If a policy, in the one or more policies 112, indicates a maximum frequency with which supplemental content may be output, the evaluation request 118 may include usage history data representing when supplemental content was previously output. If the user frustration data 116 indicates an intent, the evaluation request may include an intent of a most recent user input of the user 5 intended to receive the supplemental content 104. The evaluation request 118 may include other types of data depending on the signals to be evaluated.

The evaluation component 145 may be a Java-based component configured to process the information in the evaluation request 118 and make a determination therefrom as to whether the supplemental content 104 should, in fact, be output to the user 5. As part of its processing, the evaluation component 145 may determine whether the evaluation request 118 includes user frustration data 116 corresponding to the content topic 106, the content publisher 135 of the supplemental content 104, etc. The evaluation component 145 may also determine whether the user frustration data 116 is associated with an expiration time that has expired. If the evaluation component 145 determines the evaluation request 118 includes user frustration data 116 that has not expired, the evaluation component 145 may determine the supplemental content 104 should not be output to the user 5.

The evaluation component 145 may also determine whether at least one policy, of the one or more policies 112, is triggered by the current context. For example, if a policy indicates a device should not indicate supplemental content is available (e.g., via activation of a light indicator, display of a GUI element, vibration, etc.) during a particular time period (e.g., from 10 pm to 5 am), the evaluation component 145 may determine whether the evaluation request 118 indicates a present time corresponds to the particular time period. For further example, if a policy indicates a maximum frequency (i.e., maximum number of times within a certain time period) that supplemental content may be output, the evaluation component 145 may determine a frequency of output of supplemental content as indicated in usage history data in the evaluation request 118, and determine whether the frequency equals or is above the maximum frequency. In another example, if a policy indicates a minimum amount of time (e.g., at least 30 minutes) that should transpire between instances of outputting supplemental content, the evaluation component 145 may determine a time since a last output of supplemental content as indicated in usage history data in the evaluation request 118, and may determine whether the minimum amount of time has transpired since the last output. If the evaluation component 145 determines at least one policy is triggered, the evaluation component 145 may determine the supplemental content 104 should not be output.

The evaluation component 145 generates adjudicate response data 122. The adjudicate response data 122 may simply indicate either the supplemental content 104 should not be output, or the supplemental content 104 may be output. The adjudicate response data 122 may include the case identifier represented in the adjudicate request 102, the decision of the evaluation component 145 (i.e., whether the supplemental content 104 should not be or may be output), the one or more policies 112 that were evaluated by the evaluation component 145, and the user frustration data 116 that was evaluated by the evaluation component 145.

The evaluation component 145 may send the adjudicate response data 122 to the adjudicate orchestrator component 155, which may send the adjudicate response data 122 to the supplemental output system 105 via the API 150. If the adjudicate response data 122 indicates the supplemental content 104 may be output, the supplemental output system 105 may send the supplemental content 104 to the device 110 for output to the user 5. In some embodiments, the adjudicate response data 122, as sent to and received by the supplemental output system 105 may include only the case identifier and the decision of the evaluation component 145.

In some instances, the adjudicate request 102 may be a batch request including various instances of supplemental content that the supplemental output system 105 is prepared to output to the user 5. In such instances, the components of the filtering component 115 may process with respect to each instance of supplemental content, and the adjudicate response data 122 may include a respective decision by the evaluation component 145 for each instance of supplemental content. However, the adjudicate response data 122 may not include a ranking of the various supplemental content instances. The filtering component 115 may be configured to only determine whether supplemental content should be output, not which supplemental content should be output instead of another supplemental content. Such ranking may be performed by the supplemental output system 105.

The evaluation component 145 may also publish the adjudicate response data 122 to a storage so the adjudicate response data 122 may be analyzed to update components and processes of the filtering component 115 as desired (e.g., re-train the ML component 125).

Figure 2:
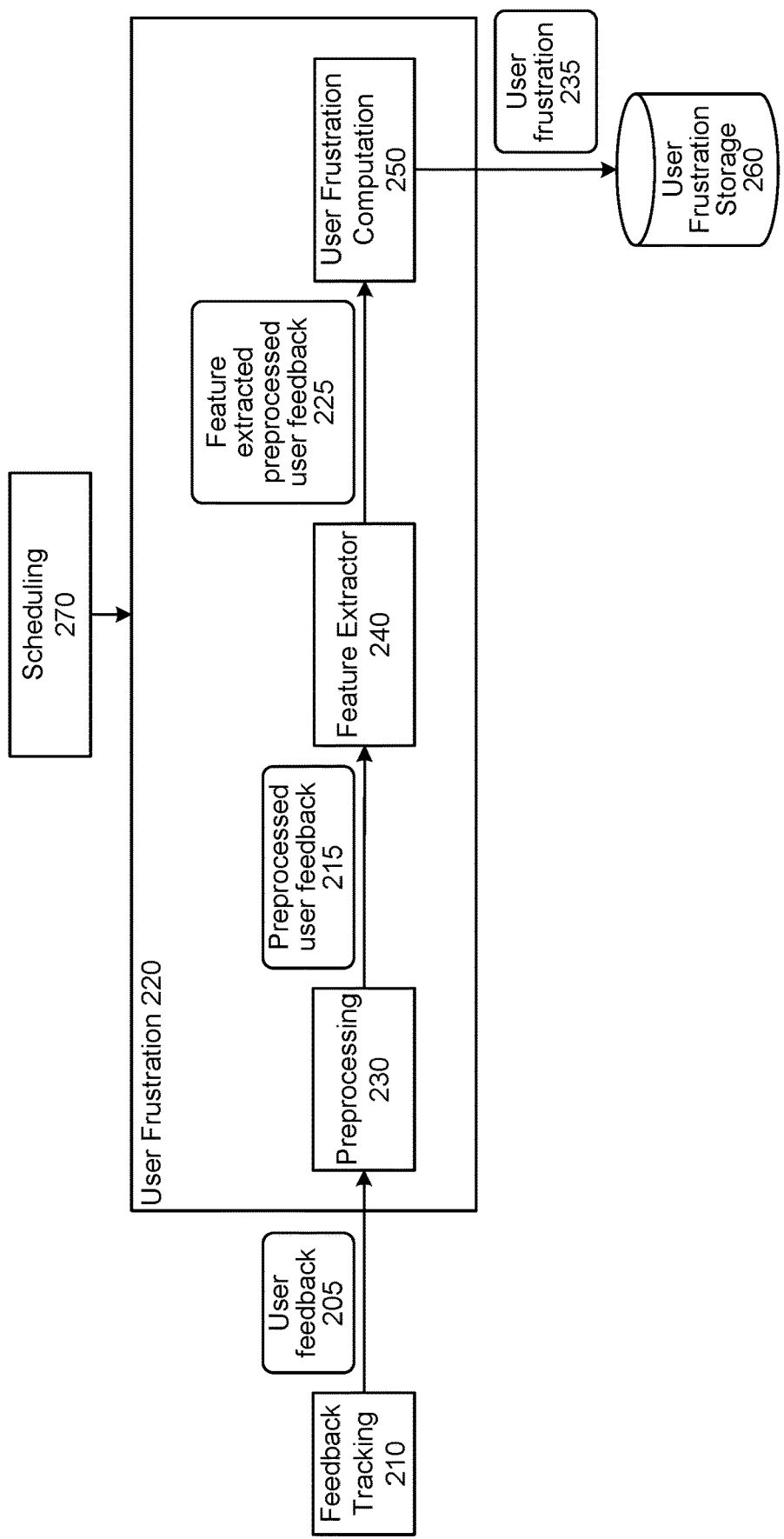
FIG. 2 is a conceptual diagram illustrating processing that may be performed to determine user frustration data, according to embodiments of the present disclosure.

Referring to FIG. 2, example processing to determine user frustration data is described. As illustrated in FIG. 2, a feedback tracking component 210 provides user feedback data 205 to a user frustration component 220. The user frustration component 220 may be implemented by a system 120 (shown in FIG. 7) and/or the device 110.

The feedback tracking component 210 may aggregate one or more types of user feedback data with respect to various users of the system 120. The feedback tracking component 210 may process user inputs indicating feedback with respect to previously output supplemental content. In some embodiments, a device 110/the system 120 may request a user provide feedback on whether output supplemental content was beneficial or otherwise of interest to the user. For example, after outputting supplemental content, the system 120 may cause a device 110 to output "Can you provide some feedback for your experience? Did you like my recommendation?" or a similar natural language output eliciting feedback from the user. The user may respond to such an output by saying "yes" (or another similar affirmative response) or "no" (or another similar negative response), or by providing feedback in other input forms, such as via a touchscreen of the device 110, by performing a gesture (e.g., thumbs up, thumbs down, etc.) that is captured by a camera of the device 110, providing a facial expression (e.g., a smile, a frown, etc.) that may be captured by a camera of the device 110, selecting a button on the device 110, etc. In some embodiments, the feedback tracking component 210 may process implicit feedback from a user. Implicit feedback may be determined by a device 110/the system 120 based on the user making certain sounds (e.g., sighing, giggling, etc.), the user interrupting output of supplemental content with another user input or by asking the device to stop/cancel the output, the user indicating a particular sentiment or emotion during output of supplemental content, etc.

While FIG. 2 illustrates one feedback tracking component 210, the present disclosure is not limited thereto. In some embodiments, multiple feedback tracking components may send user feedback data to the user frustration component 220. For example, one feedback tracking component may capture explicit user feedback, while another feedback tracking component captured implicit user feedback. For further example, a feedback tracking component may be configured to capture one or more types of user feedback with respect to supplemental content output by a particular supplemental output system 105. In some embodiments, the feedback tracking component 210 may send the user feedback data 205 on a periodic basis (e.g., the user feedback data 205 may represent user feedback received over the past 24 hours).

The user feedback data 205 may represent user feedback events corresponding to more than one user of the system 120. In other words, the user feedback data 205 may not be specific to a single user's feedback events. The user feedback data 205 may represent various user feedback events corresponding to user feedback received over a period of time (e.g., 24 hours). Each time supplemental content is output, a user feedback event associated with the supplemental content output may be generated. In some embodiments, a user feedback event may be represented in JavaScript Object Notation (JSON) format. A user feedback event may include, for example, an interaction type of "[supplemental output system identifier]," a content identifier representing the supplemental content that was output, a publisher identifier representing a content publisher 135 that provided the supplemental content to the supplemental output system, a content topic of the supplemental content, a user identifier corresponding to the user that received the supplemental content, a timestamp representing when (e.g., time of day, day of week, etc.) the supplemental content was output, whether the user indicated (at runtime) that the supplemental output system should output the supplemental content, whether the user interrupted output of the supplemental content with another user input, and whether the user pursued further action/information regarding the supplemental content after the supplemental content was output. In some embodiments, a user feedback event may also include an intent of the user input that was received prior to the supplemental content being output.

The user frustration component 220 includes a preprocessing component 230, a feature extractor 240, and a user frustration computation component 250. The user frustration component 220 may communicate with a scheduling component 270 that sets a processing schedule for the user frustration component 220. For example, the scheduling component 270 may cause the user frustration component 220 to process once a day, once a week, once a month, etc. In some embodiments, the scheduling component 270 may cause the user frustration component 220 to process in a non-periodic basis. For example, the scheduling component 270 may cause the user frustration component 220 to process in near-real time of the user feedback data 205 being received.

The user feedback data 205 may be input to the preprocessing component 230 upon being input to the user frustration component 220. The preprocessing component 230 is configured to perform various preprocessing tasks with respect to user feedback data input to the user frustration component 220 (from one or more feedback tracking components) since a last processing instance of the user frustration component 220. The preprocessing component 230 may partition the user feedback data by user identifier, and may sort user feedback events of a single user identifier by timestamp. In some instances, a single user feedback event may include more than one signal indicating the user's feedback/reaction with respect to the output of the supplemental content (e.g., one signal representing whether the user ignored the output supplemental content, another signal indicating whether the user interrupted output of the supplemental content, another signal indicating whether the user asked for more information regarding the output supplemental content, etc.). In such instances, the preprocessing component 230 may reduce the feature space by aggregating the various signals, of a single user feedback event, into one data field that collectively indicates the user's feedback with the output supplemental content. The preprocessing component 230 generates preprocessed user feedback data 215, which is sent to the feature extractor 240 of the user frustration component 220.

The feature extractor 240 is configured to extract one or more features from the preprocessed user feedback data 215. For example, in some embodiments the feature extractor 240 may compute a number of negative user feedback events that are associated with a single user identifier in the preprocessed user feedback data 215. For further example, in some embodiments the feature extractor 240 may compute a number of negative user feedback (e.g., frustration) events are associated with a given user identifier/content identifier pair. The foregoing types of feature extraction processing are merely illustrative. Various other feature extraction processing that may be relevant to the present disclosure are within the scope of one skilled in the art.

As detailed above, the scheduling component 270 may cause the user frustration component 220, and by extension the feature extractor 240, to process periodically (e.g., every 12 hours, daily, weekly, etc.). In some embodiments, the feature extractor 240 may not be limited to only processing preprocessed user feedback data received since a last processing instance of the user frustration component 220. In such embodiments, the feature extractor 240 may look to preprocessed user feedback data that was received and processed during one or more previous processing instances of the user frustration component 220. Such may enable the feature extractor 240 to determine more comprehensive and informative features than if the feature extractor 240 was limited to processing only the most recently received preprocessed user feedback data 215.

In some embodiments, the feature extractor 240 may store the preprocessed user feedback data 215 for user identifier-content identifier pairs in decreasing order of timestamp (e.g., the first user feedback event in the list may be the latest to happen in absolute time). The feature extractor 240 may tag each user feedback event with a Boolean (or other) value that represents frustration of the user. For example, for four user feedback events corresponding to the same user identifier-content identifier pair, the user's frustration can be represented in a binary-digit list, where each digit represents the user's frustration for that particular user feedback event.

The feature extractor 240 may assign an incremental rank for each user feedback event. In the case of a tie, the rank may be the same. In some embodiments, the higher the rank, the earlier the user feedback event in absolute time. The feature extractor 240 may aggregate the ranks into one number by iteratively comparing any two adjacent user feedback events, and only keeping the winner in the list. In some embodiments, the final winner may be the latest positive user feedback event (e.g., the user feedback event associated with lowest rank).

The feature extractor 240 sends feature extracted preprocessed user feedback data 225 to the user frustration computation component 250. The feature extracted preprocessed user feedback data 225 includes the preprocessed user feedback data 215 along with the features extracted by the feature extractor 240.

In general, the user frustration computation component 250 is configured to determine a user's affinity or frustration towards specific supplemental content topics, content publishers, etc. In some embodiments, the user frustration computation component 250 may determine whether the number of consecutive negative user feedback events for a given user identifier-content identifier pair satisfies a condition (e.g., is equal to or greater than a threshold number). If the number does not satisfy the condition, the user frustration computation component 250 may not store the user identifier-content identifier pair in the user frustration storage 260. Conversely, if the number satisfies the condition, the user frustration computation component 250 may store user frustration data 116 in the user frustration storage 260. The user frustration data 116 may, at least, include the user identifier-content identifier pair used to make the above determination.

In some embodiments, the feature extractor 240 may determine a number of consecutive negative user feedback events for a given user identifier-content topic pair. In such embodiments, the user frustration computation component 250 may determine whether the number of consecutive negative user feedback events for the user identifier-content topic pair satisfies a condition. If the number satisfies the condition, the user frustration computation component 250 may store the user frustration data 116 to include, at least, the user identifier/content topic pair used to make the above determination.

In some embodiments, the feature extractor 240 or the user frustration computation component 250 may determine consecutive negative user feedback events correspond to one or more particular content publisher identifiers corresponding to one or more content publishers that provided the supplemental content. In such embodiments, the user frustration computation component 250 may include the one or more content publisher identifiers in the user frustration data 116.

In some embodiments, the user frustration computation component 250 may have access to data representing user inputs and intents representing same. In such embodiments, the user frustration computation component 250 may determine an intent of a user input that is associated with the user identifier and was received prior to output of the supplemental content, and represent the intent in the user frustration data 116. In some embodiments, the intent may be represented in the user feedback data 205 as input to the user frustration component 220.

In some embodiments, the feature extractor 240 may determine consecutive negative user feedback events, associated with a specific user identifier-content topic and/or content identifier pairing, correspond to a single time frame (e.g., representing the user provided negative user feedback during certain hours of the day for the given content topic and/or content identifier). In such embodiments, the user frustration computation component 250 may include the time frame in the corresponding user frustration data 116.

In some embodiments, the user frustration computation component 250 may associate the user frustration data 116 with an expiration time in the user frustration storage 260. Storing of the user frustration data 116 in the user frustration storage 260 represents the supplemental content or content topic, represented in the user frustration data 116, is not to be output to the user corresponding to the user identifier represented in the user frustration data 116. Thus, the expiration time may represent when the user frustration data 116 should be deleted from the user frustration storage 260, thereby indicating the supplemental content or content topic may again be output to the user. In some embodiments, the expiration time may correspond to a number of days from when the user frustration data 116 was stored in the user frustration storage 260. In some embodiments, the expiration time may correspond to a timestamp of a last negative user feedback event, used to determine the user frustration data 116, plus N days. In some embodiments, the N days may be configurable by the user 5. In some embodiments, the N days may be configurable based on a number of consecutive negative user feedback events used to determine the user frustration data 116 (e.g., more consecutive negative user feedback events may correspond to a higher N days).

In some embodiments, a single user frustration storage 260 may be implemented to store user frustration data representing supplemental content output by different supplemental output systems 105. In some embodiments, more than one user frustration storage may be implemented, with each user frustration storage corresponding to a different supplemental output system.

Figure 3:
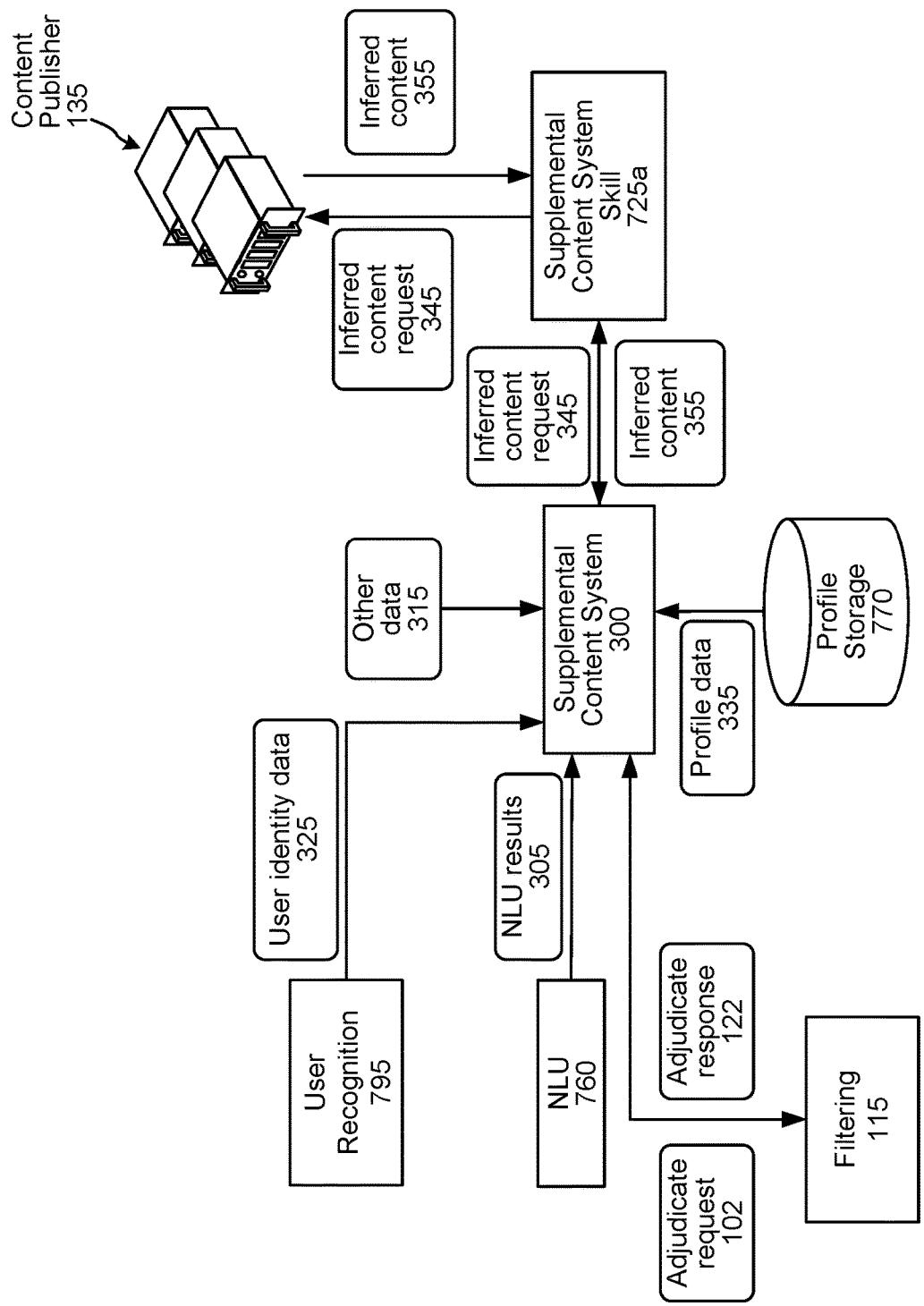
FIG. 3 is a conceptual diagram illustrating how a supplemental content system may process data, according to embodiments of the present disclosure.

FIG. 3 illustrates how the supplemental content system 300 may determine inferred content associated with but not directly responsive to a user input as well as determine whether the inferred content should be output to a user. Each time a NLU component 760 (described herein with respect to FIG. 7) outputs NLU results data 305, the NLU results data 305 may be input to the supplemental content system 300. The supplemental content system 300 determines whether inferred content associated with but not directly responsive to the user input should be output.

The supplemental content system 300 may base its determinations at least in part on non-user specific data, such as skill-provided data, system generated intent pairs, etc.

The supplemental content system 300 may determine whether inferred content should be output based on data accompanying output data provided to the system 120 by a skill 725. Such data may be represented as other data 315. In addition to providing the system 120 with output data responsive to a user input, the skill 725 may provide the system 120 with presentation framework data. The presentation framework data may include information indicating the types of content (e.g., audio, image, video, etc.) represented in the output data as well as one or more devices associated with the user 5 that should be used to output the different types of output data. The presentation framework data may, in some instances, also include information indicating the system 120 should determine inferred content associated with the output data, but which is not directly responsive to the user input. When the presentation framework data includes such information, the supplemental content system 300 may determine inferred content may be output.

The supplemental content system 300 may also determine whether inferred content should be output based on data provided to the system 120 by a skill 725, with the data not accompanying output data. Such data is represented as other data 315. A skill 725 may provide the system 120 with data indicating that any time the NLU results data 305 indicates a particular intent, the supplemental content system 300 should solicit the skill 725 as to whether the skill 725 has inferred content that may be output. For example, a concert ticket skill may provide the system 120 with data indicating that anytime the NLU results data 305 indicates a <PlayMusic> intent, the supplemental content system 300 should solicit the concert ticket skill as to whether the concert ticket skill has access to information indicating a concert put on by a resolved artist entity represented in the NLU results data 305. For further example, an electronic calendar skill may provide the system 120 with data indicating that anytime the NLU results data 305 indicates an <OutputTime> intent, the supplemental content system 300 should solicit the electronic calendar skill as to whether the electronic calendar skill has calendar entries associated with an electronic calendar associated with the device 110 and/or user 5. Yet further, for example, a traffic report skill may provide the system 120 with data indicating that anytime the NLU results data 305 indicates a <BookRide> intent, the supplemental content system 300 should solicit the traffic report skill to provide current traffic report information.

The supplemental content system 300 may also determine whether inferred content should be output based on the intent represented in the NLU results data 305. The system 120 may store intent pair data (illustrated as other data 315) corresponding to pairs of intents. Each pair of intents may be associated with a respective score representing a likelihood that a second intent of the pair will be invoked by a user within a time threshold subsequent to content responsive to the first intent being output. The scores of various intent pairs may be normalized. The intent pair data may be untailored with respect to any given user of the system 120. For example, the intent pair data may include the following intent pairs with corresponding scores:

[0.345]<GetWeather>; <GetTraffic>
[0.217]<OrderPizza>; <PlayMovie>
[0.121]<PlayMusic>; <SetVolume>

The intent pair data may be configured based solely upon the natures of the intents. For example, a pair of intents may include a <PlayMusic> intent and a <Change Volume> intent. The pair of intents may be associated with a score representing a likelihood that a user may input a first user input corresponding to the <PlayMusic> intent immediately prior to the user inputting a second user input corresponding to the <ChangeVolume> intent based solely on the <PlayMusic> intent and the <ChangeVolume> intent both relating to output of audio from the system 120. For further example, a pair of intents may include a <BookPlaneTicket> intent and a <GetWeather> intent. This pair of intents may be associated with a score indicating a likelihood that users who by plane tickets often ask about the weather for their destination.

Intents may also be paired based on system usage history associated with various different users. Pairing of the intents may be skill agnostic. Thus, both the first intent and the second intent of a pair of intents may be associated with a single skill, or the first intent of the pair may be associated with a first skill while the second intent of the pair may be associated with a second skill. For example, a pair of intents may include a <PlayMusic> intent and a <Change Volume> intent, where both the <PlayMucic> intent and the <Change Volume> intent correspond to a music skill. For further example, a pair of intents may include a <BookPlaneTicket> intent and a <GetWeather> intent, where the <BookPlaneTicket> intent corresponds to a booking skill and the <GetWeather> intent corresponds to a weather skill. Pairing of the intents may also be agnostic with respect to the 1P or 3P nature of the skills associated with the intents. That is, both of the intents of a pair may be associated with one or more 1P skills implemented by the system 120/device 110, both of the intents of a pair may be associated with one or more 3P skills in communication with the system 120/device 110, or a first intent of a pair may be associated with a 1P skill while the second intent of the pair is associated with a 3P skill. For example, a pair of intents may include a <PlayMusic> intent and a <Change Volume> intent, where both the <PlayMusic> intent and the <Change Volume> intent are executed by a 1P skill. For further example, a pair of intents may include a <PlayMusic> intent and a <ChangeVolume> intent, where both the <PlayMusic> intent and the <Change Volume> intent are executed by a 3P music skill. For further example, a pair of intents may include a <BookPlaneTicket> intent and a <PlayMusic> intent, where the <BookPlaneTicket> intent is executed by a 3P skill and the <PlayMusic> intent is executed by a 1P skill.

The intent pair data may alternatively be user-specific. For example, if a user routinely invokes a <ChangeVolume> intent subsequent to a <PlayMusic> intent, the system 120 may increase the score associated with a pair of intents corresponding to these intents. Conversely, if the user rarely invokes the <ChangeVolume> intent subsequent to the <PlayMusic> intent, the system 120 may decrease the score associated with a pair of intents correspond to these intents.

The supplemental content system 300 may also base its determinations at least in part on present user input originating user-specific data. Each user may have a different tolerance regarding how many times inferred content is output in a given period of time, what kinds of inferred content are output, as well as how inferred content is presented.

The supplemental content system 300 may receive user identity data 325 from the user recognition component 795. The user identity data 325 may indicate the present user input originating user 5 (e.g., include a user identifier of the user 5).

If the supplemental content system 300 determines inferred content (an example of supplemental content) should be output, the supplemental content system 300 generates an inferred content request 345, and sends same to a supplemental content system skill 725a configured to determine inferred content associated with but not directly responsive to the current user input. The inferred content request 345 may include at least a portion of the NLU results data 305, and optionally at least a portion of the profile data 335 and/or at least a portion of the other data 315.

The inferred content request 345 may indicate a specific skill that should be solicited for inferred content. As described above, a skill may provide the system 120 with data indicating that any time NLU results data indicates a particular intent, the supplemental content system 300 should solicit the skill as to whether the skill has inferred content that may be output. When the supplemental content system 300 determines the NLU results data 305 indicates the particular intent, the inferred content request 345 may include an indication that the supplemental content system skill 725a should solicit the specific skill for inferred content associated with one or more resolved entities represented in the NLU results data 305.

The supplemental content system skill 725a may determine a skill from which to receive inferred content from based on the NLU results data 305. For example, the supplemental content system skill 725a may determine the NLU results data 305 includes a <PlayMusic> intent and a resolved artist of "Adele." Based thereon, the supplemental content system skill 725a may determine a concert booking skill from which to receive inferred content from.

The supplemental content system skill 725a may send the inferred content request 345 to one or more content publisher 135. A content publisher 135 may provide the supplemental content system skill 725a with inferred content 355 associated with but not directly responsive to the user input. The supplemental content system skill 725a then sends the inferred content 355 to the supplemental content system 300.

In response to receiving the inferred content 355, the supplemental content system 300 may send the adjudicate request 102, corresponding to the inferred content 355, to the filtering component 115. The filtering component 115 may then process as described herein to generate adjudicate response data 122 for the inferred content 355. If the adjudicate response data 122 indicates the inferred content 355 may be output, the supplemental content system 300 may, in response to receiving the adjudicate response data 122, output the inferred content 355 to the user 5 via the device 110. The inferred content 355 may be output as synthesized speech, displayed text, etc.

In some instances, more than one content publisher 135 may send inferred content to the supplemental content system skill 725a, and the supplemental content system skill 725a may send the multiple instances of inferred content to the supplemental content system 300. In such instances, the supplemental content system 300 may send an adjudicate request for each inferred content to the filtering component 115, and the filtering component 115 may generate an adjudicate response for each adjudicate request. The supplemental content system 300 may then rank which single inferred content, of the various instances of inferred content, should be output based at least in part on the adjudicate responses.

In some embodiments, the supplemental content system 300 may send a batch adjudicate request, indicating various instances of inferred content, to the filtering component 115. In such embodiments, the filtering component 115 may generate a single adjudicate response representing decisions of the evaluation component 145 for the different instances of inferred content, and the supplemental content system 300 may rank which single inferred content to output based at least in part on the single adjudicate response.

In some instances, a content publisher 135 may be unable to determine inferred content, and the content publisher 135 may provide the supplemental content system skill 725a with an indication of such.

Figure 4:
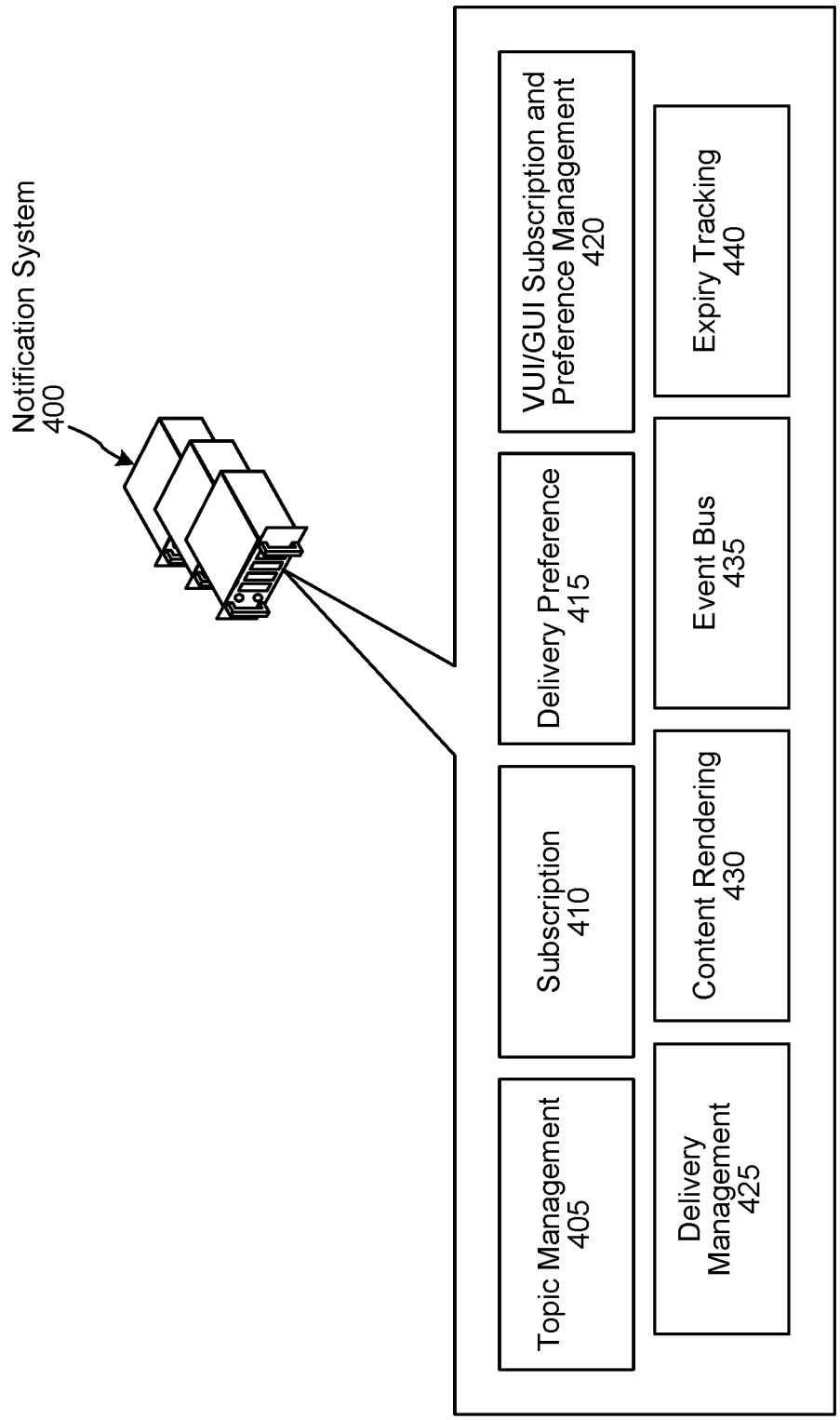
FIG. 4 is a conceptual diagram of components of a notification system, according to embodiments of the present disclosure.

Referring now to FIG. 4, components of the notification system 400 are described. The notification system 400 may include a topic management component 405, a subscription component 410, a delivery preference component 415, a VUI/GUI subscription and preference management component 420, a delivery management component 425, a content rendering component 430, an event bus 435, an expiry tracking component 440, and/or other components.

The topic management component 405 may include a repository of content topics supported by the notification system 400. Example content topics include, but are not limited to, meeting start time, new email, sporting event update, weather update, taxi arrival, product delivery, and media (e.g., television) start time.

The topic management component 405 may also include a repository of schemas for content topics. A schema may define the structure data is to take for a particular content topic. For example, a schema may indicate data, corresponding to a particular content topic as received from a content publisher 135, is to include supplemental content and one or more particular types of metadata (e.g., an identifier of the content publisher, whether the supplemental content is requested or inferred, a topic of the supplemental content, how the content publisher prefers the supplemental content be indicated to a user(s), how the content publisher prefers the supplemental content be output to a user(s), a validity duration of the supplemental content, etc.). In some embodiments, each schema may be associated with only one content topic, and each content topic may be associated with only one schema. In other embodiments, a schema may be associated with more than one content topic and/or a content topic may be associated with more than one schema.

The topic management component 405 may include one or more APIs. The topic management component 405 may include one or more APIs for content publishers 135 to get a schema. For example, the topic management component 405 may be configured such that each schema is associated with a respective, different API. The topic management component 405 may also include one or more APIs that enable the topic management component 405 to fetch the one or more topics supported by a content publisher 135.

The subscription component 410 may manage all requested supplemental content subscriptions. The subscription component 410 may communicate with a subscription storage (not illustrated) containing all requested supplemental content subscriptions. The subscription component 410 may implement one or more APIs that enable users to subscribe to receive particular supplemental content topics. In some embodiments, the one or more APIs may include one or more Create, Read, Update, and Delete (CRUD) APIs.

When a user/group of users subscribes to receive a content topic, the subscription component 410 may associate, in the subscription storage, a user/group identifier, of the user/group of users, with a content topic indicator corresponding to the content topic. In some situations, the user/group of users may subscribe to receive a content topic from one or more particular content publishers 135. In such situations, the subscription component 410 may associate, in the subscription storage, the user/group identifier with the content topic indicator and each identifier of each of the one or more content publishers 135. The data, in the subscription storage, enables user/group identifier-based retrieval of requested content subscriptions.

The delivery preference component 415 may manage all requested content delivery preferences. The delivery preference component 415 may communicate with a requested content delivery preference storage (not illustrated) containing all requested content delivery preferences. The delivery preference component 415 may implement one or more APIs that enable users to indicate preferences for receiving requested content (e.g., activation of a light indicator, display of a banner, a time when requested content can be or should not be output, etc.). In some embodiments, the one or more APIs may include one or more CRUD APIs.

In some instances, a user/group of users may indicate a delivery preference(s) with respect to a particular content topic. In such instances, the delivery preference component 415 may associate, in the requested content delivery preference storage, a user/group identifier, of the user/group of users, with a content topic indicator, corresponding to the content topic, and data representing the delivery preference (s). In some situations, the user/group of users may indicate a delivery preference(s) with respect to a content topic and one or more particular content publishers 135. In such situations, the delivery preference component 415 may associate, in the requested content delivery preference storage, the user/group identifier with the content topic indicator, each identifier of each of the one or more content publishers 135, and data representing the delivery preference(s). The data, in the requested content delivery preference storage, enables user/group identifier-based retrieval of requested content delivery preferences.

The VUI/GUI subscription and preference management component 420 may be configured to authenticate incoming user requests that originate from a companion application. A companion application is one that may be installed on a handheld device 110 (e.g., a smart phone or tablet) and that enables the handheld device 110 to communicate with the system 120 and the notification system 400. An example of a companion application is the Amazon Alexa application that may be installed on handheld devices.

The VUI/GUI subscription and preference management component 420 may include one or more APIs. In some embodiments, the one or more APIs may include one or more external proxy representation state transfer (REST) APIs that enable authentication of user requests. In some embodiments, the one or more APIs may include a backend proxy API.

The delivery management component 425 manages the runtime delivery of content (i.e., determines how content should be indicated to a user). The delivery management component 425 may include one or more APIs to manage runtime delivery of content. In some embodiments, the one or more APIs may include one or more CRUD APIs. For example, when the notification system 400 receives supplemental content for a user, the delivery management component 425 may be called to determine how the supplemental content should be indicated to the user. Such determination may be based on various considerations.

In some embodiments, the delivery management component 425 may determine supplemental content should be indicated only if the corresponding content publisher 135 has registered with the notification system 400 to provide supplemental content to users. In some embodiments, the delivery management component 425 may determine supplemental content should be indicated only if the corresponding content publisher 135 has registered with the notification system 400 to provide supplemental content of the particular content topic of the supplemental content. In some embodiments, the delivery management component 425 may determine supplemental content should be indicated only if one or more devices of the intended recipient are not in a "do not disturb" mode (i.e., device identifiers of the one or more devices are not associated with do not disturb indicators/flags).

The delivery management component 425 may also determine preferences for how supplemental content should be indicated to the intended recipient. For example, the delivery management component 425 may determine a preference(s) of the content publisher 135 and/or the intended recipient. In some embodiments, the preference(s) of the content publisher 135 may be determined from the metadata associated with the received supplemental content. In some embodiments, the preference(s) of the intended recipient may be determined from a subscription(s) of the intended recipient. A preference(s) may indicate an output type for indicating the supplemental content (e.g., activation of a light indicator, display of a GUI element, vibration of a device, etc.) and/or when (e.g., time of day, day of week, etc.) the supplemental content may be indicated.

The delivery management component 425 may determine an output type(s) for indicating supplemental content. The delivery management component 425 may determine the output type(s) based on a preference(s) of a content publisher, a preference(s) of the intended recipient, and/or characteristics/components of one or more devices 110 of the intended recipient.

The content rendering component 430 is configured to generate read-time supplemental content. The content rendering component 430 may generate read-time supplemental content using one or more templates, using a serial peripheral interface (SPI) callback, or determining pre-configured supplemental content (e.g., requested content may be pre-configured). When generating the read-time supplemental content, the content rendering component 430 may validate that the generated supplemental content includes valid speech synthesis markup language (SSML).

The event bus 435 may allow content publishers 135 and other devices to publish events to the notification system 400. The event bus 435 may also allow other systems to subscribe to receive events published to the event bus 435 by components of the notification system 400.

The expiry tracking component 440 is configured to determine when supplemental content is expiring, and causing the supplemental content to be indicated and/or proactively output to an intended user.

Figure 5:
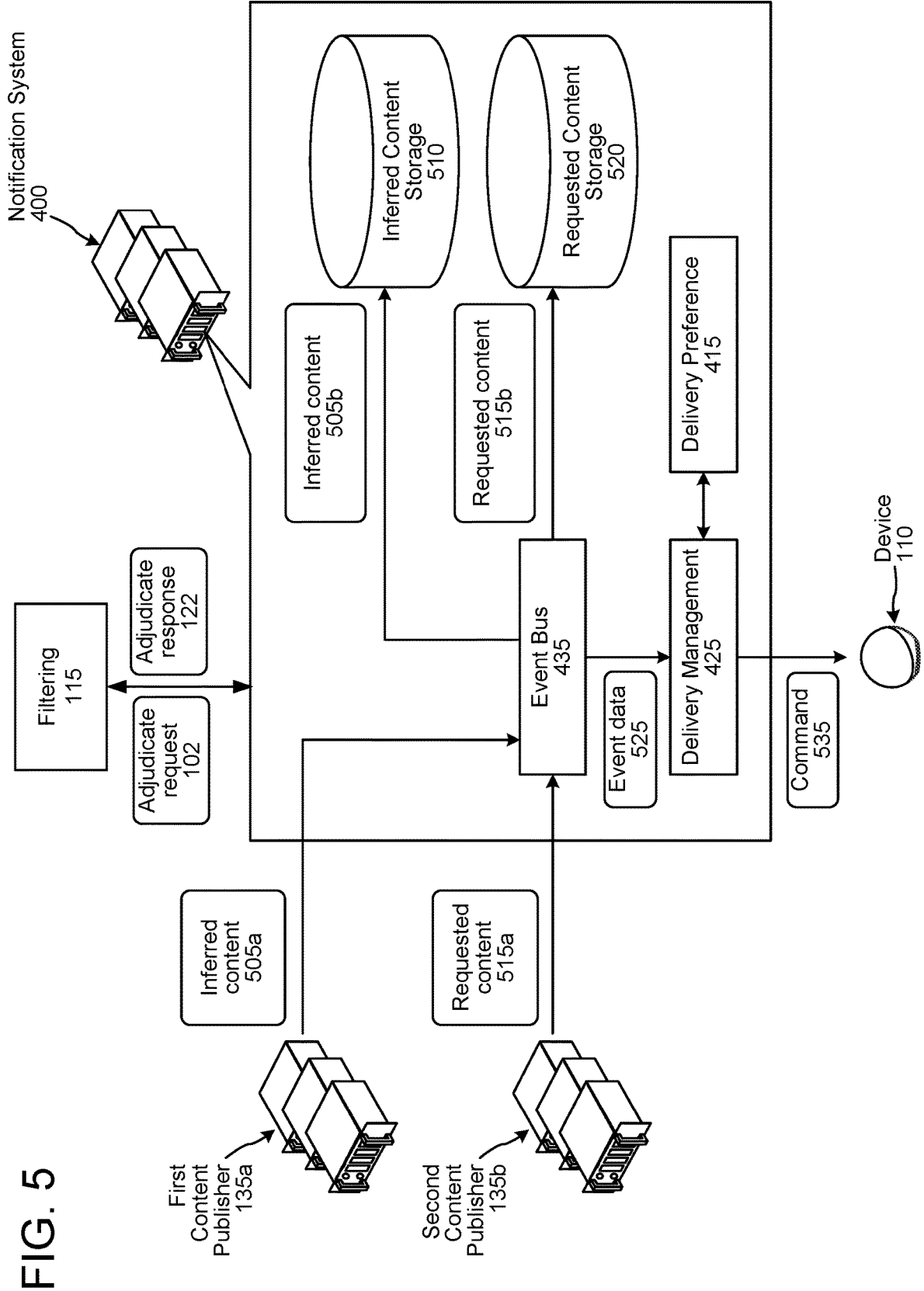
FIG. 5 is a conceptual diagram of components for indicating supplemental content using the notification system, according to embodiments of the present disclosure.

Referring now to FIG. 5, it is described how the notification system 400 may receive supplemental content and indicate same. A first content publisher 135a may send inferred content 505a to the event bus 435 of the notification system 400. In some embodiments, the inferred content 505a may be in a structured, tagged, non-natural language format. In other words, the inferred content 505a may not be in a format suitable for output to an intended user and/or group of users. For example, the inferred content 505a may include "NotificationTopic: Shopping Recommendation; Product: [product description]; Price: [product price]," representing a product having a specific price is available for purchase. For further example, the inferred content 505a may include "NotificationTopic: Feature/Functionality Recommendation; Feature/Functionality: [feature/functionality description]," representing a computing feature/functionality is available for use.

In some embodiments, the inferred content 505a may be in natural language. For example, the inferred content 505a may be "[product description] is available for purchase at [price], would you like me to order it for you?" For further example, the inferred content 505a may be "[feature/functionality description], would you like to enable?"

The inferred content 505a may be accompanied by (i.e., associated with) metadata. In some embodiments, the metadata may include a single user identifier corresponding to a single user to receive the inferred content 505a. For example, the inferred content 505a may recommend a user purchase a product based on the product being included in the user's electronic "wishlist" and/or based on a purchase history of the user. For further example, the inferred content 505a may recommend a feature/functionality of the system 120/device 110/skill 725 to a user that has used another feature/functionality of the system 120/device 110/skill 725 within a past amount of time (e.g., within a past day, week, month, etc.). In the foregoing examples, the metadata may include the user identifier of the particular user to receive the inferred content 505a.

In some embodiments, the metadata may include a group identifier corresponding to a group of users to receive the inferred content 505a. For example, the inferred content 505a may recommend a user group purchase a product based on the product being included in the user group's electronic "wishlist" and/or based on a purchase history of the user group. For further example, the inferred content 505a may recommend a feature/functionality of the system 120/device 110/skill 725 to a user group that has used another feature/functionality of the system 120/device 110/skill 725 within a past amount of time (e.g., within a past day, week, month, etc.). In the foregoing examples, the metadata may include the group identifier of the user group to receive the inferred content 505a.

In some embodiments, the metadata may include a user identifier(s) and/or group identifier(s) stored in the profile storage 770. In at least some embodiments, the metadata may include an encoded user identifier corresponding to a user identifier stored in the profile storage 770. In some embodiments, the metadata may include an encoded group identifier corresponding to a group identifier stored in the profile storage 770. In some embodiments, to maintain user privacy, the first content publisher 135a may not have access to a user identifier and/or group identifier stored in the profile storage 770. In these embodiments, the metadata may include an identifier that uniquely corresponds to a particular user identifier and/or group identifier stored in the profile storage 770.

In some embodiments, the metadata may include a parameter for identifying one or more users to receive the inferred content 505a. For example, the inferred content 505a may recommend a feature/functionality of the system 120/device 110/skill 725 to users that have used another feature/functionality of the system 120/device 110/skill 725 within a past amount of time (e.g., within a past day, week, month, etc.). In this example, the metadata may include the parameter of "used [feature/functionality description] within [past amount of time]."

In some embodiments, the metadata may include multiple user and/or group identifiers corresponding to multiple users and/or user groups to receive the inferred content 505a.

In some embodiments, the metadata may indicate a validity duration of the inferred content 505a. In other words, the metadata may indicate an amount of time (e.g., minutes, hours, days, etc.) that the inferred content 505a is valid for. In other embodiments, the first content publisher 135a may indicate a validity duration of a content topic when the first content publisher 135a registers with the notification system 400 to provide supplemental content to users thereof. In such embodiments, the metadata may include a content topic (e.g., product recommendation, feature/functionality recommendation, etc.), and the notification system 400 may determine the content topic in the metadata, determine the inferred content 505a and metadata was received from the first content publisher 135a, and, based on the foregoing, determine a validity duration of the inferred content 505a.

In some embodiments, the metadata may indicate an output type the first content publisher 135a recommends be used to output the inferred content 505a. For example, the metadata may indicate the inferred content 505a should be output as synthesized speech. For further example, the metadata may indicate the inferred content 505a should be output using a display. As another example, the metadata may indicate the inferred content 505a should be output both as synthesized speech and using a display. In a further example, the metadata may indicate the inferred content 505a may be output either as synthesized speech or using a display.

In some embodiments, the metadata may include a first content publisher identifier corresponding to the first content publisher 135a.

In some embodiments, the first content publisher 135a may send the inferred content 505a and associated metadata to the event bus 435 via an API.

The event bus 435 may communicate with an inferred content storage 510. The inferred content storage 510 may be implemented by the notification system 400. When the metadata, associated with the inferred content 505a, includes a user identifier, the inferred content storage 510 may store an association between inferred content 505b (corresponding to the inferred content 505a), the user identifier, and the metadata. When the metadata, associated with the inferred content 505a, includes a group identifier, the inferred content storage 510 may store an association between the inferred content 505b, the group identifier, and the metadata. Additionally or alternatively, when the metadata, associated with the inferred content 505a, includes a group identifier, the notification system 400 may determine one or more user identifiers associated with the group identifier, and the inferred content storage 510 may store an association between the inferred content 505b, the metadata, and each of the one or more user identifier associated with the group identifier. When the metadata, associated with the inferred content 505a, includes a parameter for identifying one of more users, the notification system 400 may determine one or more user identifiers and/or one or more group identifiers corresponding to the parameter (e.g., having a usage history, user demographic information, etc. corresponding to the parameter), and the inferred content storage 510 may store an association between the inferred content 505, the metadata, and each of the one or more user identifiers and/or group identifiers corresponding to the parameter.

In some situations, the inferred content storage 510 may store more than one inferred content associated with a single user or group identifier at a point in time. In some embodiments, the notification system 400 may be configured to determine a score (e.g., confidence score, probability score, etc.) representing inferred content should in fact be output to a user. The inferred content storage 510 may associate inferred content with its respective score such that the inferred contents associated with a single user or group identifier may effectively be ranked within the inferred content storage 510 according to priority of output.

In some embodiments, the inferred content 505b may be a copy of the inferred content 505a. For example, the inferred contents 505a/505b may both be a structured, non-natural language formatted inferred content.

In some embodiments, the notification system 400 may receive the inferred content 505a in a structured, non-natural language form, but the inferred content storage 510 may store the inferred content 505b in a natural language form. In some embodiments, the notification system 400 may use a template-based approach to generate the natural language formatted inferred content 505b. A template may include natural language with portions (e.g., variables) to be populated with information from the structured, non-natural language inferred content 505a. A template may be associated with a content publisher 135. A template may additionally or alternatively be associated with a content topic. In some embodiments, the notification system 400 may perform one or more art-known/industry-known natural language generation techniques using the structured, non-natural language inferred content 505a to generate the corresponding natural language inferred content 505b.

In some embodiments, upon receiving the inferred content 505a and associated metadata, the notification system 400 may send an adjudicate request 102, corresponding to the inferred content 505a, to the filtering component 115. The filtering component 115 may then process as described herein to generate adjudicate response data 122 for the inferred content 505a. If the adjudicate response data 122 indicates the inferred content 505a may be output, the notification system 400 may, in response to receiving the adjudicate response data 122, store the inferred content 505b and associated data in the inferred content storage 510. Conversely, if the adjudicate response data 122 indicates the inferred content 505a should not be output, the notification system 400 may, in response to receiving the adjudicate response data 122, prevent the inferred content 505a and associated data from being stored in the inferred content storage 510.

In some embodiments, inferred content may not be output until a user receives requested content as well. In such embodiments, the storage of the inferred content 505b (and associated metadata) in the inferred content storage 510 may not, in and of itself, cause other processing of the notification system 400 to be commenced.

Sometime after receiving and storing the inferred content 505a/505b, a second content publisher 135b may send requested content 515a to the event bus 435. While FIG. 5 illustrates first and second content publishers 135a/135b, it will be appreciated that the same content publisher may send both the inferred content 505a and the requested content 515a to the event bus 435.

In some embodiments, the requested content 515a may be in a structured, tagged, non-natural language format. In other words, the requested content 515a may not be in a format suitable for output to an intended user and/or group of users. For example, the requested content 515a may include "NotificationTopic: Meeting; Participant: John; Time: 15 minutes," representing a meeting with John is starting in 15 minutes. For further example, the requested content 515*a* may include "NotificationTopic: Email; SenderName: Jane; Time: 2 minutes," representing an email was received from Jane 2 minutes ago. In another example, the requested content 515*a* may include "NotificationTopic: GameUpdate; SportsTeamName: Seahawks; Time: 30 minutes," representing a Seahawks game is starting in 30 minutes. For further example, the requested content 515*a* may include "NotificationTopic: Weather Update; Weather: Rain; Time: 45 minutes," representing it will start raining in about 45 minutes. In another example, the requested content 515*a* may include "NotificationTopic: Taxi Update; TaxiServiceName: Bob's; ArrivalTime: 3 minutes; Vehicle: Red sedan; LicensePlate: ABCD1234; PickupLocation: 123 First Street," representing a red sedan, having license plate ABCD1234, from Bob's taxi service will be arriving in about 3 minutes at 123 First Street. For further example, the requested content 515*a* may include "NotificationTopic: Delivery Update; Product: Dish soap; Delivery Time: 45 minutes," representing ordered dish soap is expected to be delivered in about 45 minutes. In another example, the requested content 515*a* may include "NotificationTopic: Media Update; TelevisionShow: News; Time: 10 minutes," representing the news will begin being televised in 10 minutes.

In some embodiments, the requested content 515*a* may be in natural language. For example, the requested content 515*a* may be "meeting with John is starting in 15 minutes." For further example, the requested content 515*a* may be "you received an email from Jane 2 minutes ago." In another example, the requested content 515*a* may be "the Seahawks game is starting in 30 minutes." For further example, the requested content 515*a* may be "it will start raining in about 45 minutes." In another example, the requested content 515*a* may be "a red sedan, having license plate ABCD1234, from Bob's taxi service will be arriving in about 3 minutes at 123 First Street." For further example, the requested content 515*a* may be "your dish soap order is expected to be delivered in about 45 minutes." In another example, the requested content 515*a* may be "the news will begin in 10 minutes."

The requested content 515*a* may be accompanied by (i.e., associated with) metadata. In some embodiments, the metadata may include a single user identifier corresponding to a single user to receive the requested content 515*a*. In some embodiments, the metadata may include a group identifier corresponding to a group of users to receive the requested content 515*a*. In some embodiments, the metadata may include multiple user and/or group identifiers corresponding to multiple users and/or user groups to receive the requested content 515*a*.

In some embodiments, the metadata may include a user identifier(s) and/or group identifier(s) stored in the profile storage 770. In at least some embodiments, the metadata may include an encoded user identifier corresponding to a user identifier stored in the profile storage 770. In some embodiments, the metadata may include an encoded group identifier corresponding to a group identifier stored in the profile storage 770. In some embodiments, to maintain user privacy, the second content publisher 135*b* may not have access to a user identifier and/or group identifier stored in the profile storage 770. In these embodiments, the metadata may include an identifier that uniquely corresponds to a particular user identifier and/or group identifier stored in the profile storage 770.

In some embodiments, the metadata may indicate a validity duration of the requested content 515*a*. In other words, the metadata may indicate an amount of time (e.g., minutes, hours, days, etc.) that the requested content 515*a* is valid for. In other embodiments, the second content publisher 135*b* may indicate a validity duration of a content topic when the second content publisher 135*b* registers with the notification system 400 to provide supplemental content to users thereof. In such embodiments, the metadata may include a content topic (e.g., email notification, sporting event update, etc.), and the notification system 400 may determine the content topic in the metadata, determine the requested content 515*a* and metadata was received from the second content publisher 135*b*, and, based on the foregoing, determine a validity duration of the requested content 515*a*.

In some embodiments, the metadata may indicate an output type the second content publisher 135*b* recommends be used to notify the user(s) and/or user group(s) of the requested content 515*a*. For example, the metadata may represent indication of the requested content 515*a* should be conducted by activating a light indicator (e.g., a light ring, light emitting diode (LED), etc.) in a particular manner (e.g., exhibit a particular color, blink in a particular manner, etc.); displaying a GUI element, such as a banner, card, or the like; vibrating in a particular manner (e.g., at a particular vibration strength, particular vibration pattern, etc.); and/or using some other notification mechanism.

In some embodiments, the metadata may indicate an output type the second content publisher 135*b* recommends be used to output the requested content 515*a*. For example, the metadata may indicate the requested content 515*a* should be output as synthesized speech. For further example, the metadata may indicate the requested content 515*a* should be output using a display. As another example, the metadata may indicate the requested content 515*a* should be output both as synthesized speech and using a display. In a further example, the metadata may indicate the requested content 515*a* may be output either as synthesized speech or using a display.

In some embodiments, the metadata may include a second content publisher identifier corresponding to the second content publisher 135*b*.

In some embodiments, the second content publisher 135*b* may send the requested content 515*a* and associated metadata to the event bus 435 via an API. In some embodiments, the notification system 400 may be configured with a first API for sending inferred content to the event bus 435, and a second API for sending requested content to the event bus 435. In some embodiments, the notification system 400 may be configured with a single API for sending supplemental content (i.e., inferred content and requested content) to the event bus 435. In such embodiments, supplemental content may be associated with metadata indicating whether the supplemental content is inferred or requested. Additionally or alternatively, in such embodiments, the metadata may include a content topic, and the notification system 400 may determine whether associated supplemental content is inferred or requested based on the content topic.

The event bus 435 may communicate with a requested content storage 520. The requested content storage 520 may be implemented by the notification system 400. When the metadata, associated with the requested content 515*a*, includes a user identifier, the requested content storage 520 may store an association between requested content 515*b* (corresponding to the requested content 515*a*), the user identifier, and the metadata. When the metadata, associated with the requested content 515*a*, includes more than one user identifier, the requested content storage 520 may store an association between the requested content 515*b*, the metadata, and each of the more than one user identifiers. When the metadata, associated with the requested content 515*a*, includes a group identifier, the requested content storage 520 may store an association between the requested content 515*b*, the group identifier, and the metadata. Additionally or alternatively, when the metadata, associated with the requested content 515*a*, includes a group identifier, the notification system 400 may determine one or more user identifiers associated with the group identifier, and the requested content storage 520 may store an association between the requested content 515*b*, the metadata, and each of the one or more user identifiers associated with the group identifier.

In some situations, the requested content storage 520 may store more than one requested content associated with a single user or group identifier at a point in time. In some embodiments, the notification system 400 may be configured to determine a score (e.g., confidence score, probability score, etc.) representing requested content should in fact be output to a user. The requested content storage 520 may associate requested content with its respective score such that the requested contents associated with a single user or group identifier may effectively be ranked within the requested content storage 520 according to priority of output.

In some embodiments, the requested content 515*b* may be a copy of the requested content 515*a*. For example, the requested contents 515*a*/515*b* may both be a structured, non-natural language formatted requested content.

In some embodiments, the notification system 400 may receive the requested content 515*a* in a structured, non-natural language form, but the requested content storage 520 may store the requested content 515*b* in a natural language form. In some embodiments, the notification system 400 may use a template-based approach to generate the natural language formatted requested content 515*b*. A template may include natural language with portions (e.g., variables) to be populated with information from the structured, non-natural language requested content 515*a*. A template may be associated with a content publisher 135. A template may additionally or alternatively be associated with a content topic. In some embodiments, the notification system 400 may perform one or more art-known/industry-known natural language generation techniques using the structured, non-natural language requested content 615 to generate the corresponding natural language requested content 515*b*.

In some embodiments, the subscription component 410 (of the notification system 400) may confirm the intended user and/or group or users subscribed to receive the requested content 515*a* prior to storing the requested content 515*b* in the requested content storage 520. For example, the subscription component 410 may determine the user identifier and/or group identifier associated with the requested content 515*a*, and determine (in a subscription storage) whether the user and/or group identifier is associated with an identifier of the second content publisher 135*b* (and optionally the content topic represented in the metadata associated with the requested content 515*a*). If the subscription component 410 determines the user and/or group of users has not subscribed to receive the requested content 515*a* (e.g., the subscription storage is not storing an association between the user and/or group identifier and an identifier of the second content publisher 135*b*, and optionally the content topic), the subscription component 410 may prevent the requested content 515*b* from being stored in the requested content storage 520. Conversely, if the subscription component 410 determines the user and/or group of users has subscribed to receive the requested content 515*a* (e.g., the subscription storage is storing an association between the user and/or group identifier and an identifier of the second content publisher 135*b*, and optionally the content topic), the subscription component 410 may store the requested content 515*b* in the requested content storage 520.

As described above, the notification system 400 may be configured to store supplemental content in two separate storages (i.e., store inferred content in the inferred content storage 510 and requested content in the requested content storage 520). In some embodiments, the notification system 400 may store all supplemental content in a single supplemental content storage (not illustrated). In such embodiments, in addition to the data associations detailed above, each supplemental content in the single supplemental content storage may be associated with data indicating whether the supplemental content is inferred or requested.

It will be appreciated that the foregoing processing and storage with respect to the inferred content 505*b* and requested content 515*b* may be performed with respect to additional inferred content and/or requested content intended for a same user and/or group of users.

After receiving the requested content 515*a* from the second content publisher 135*b* (and optionally after storing the requested content 515*b* in the requested content storage 520), the event bus 435 may publish event data 525 representing the requested content 515*a* has been received (or the requested content 515*b* has been stored). The delivery management component 425 subscribes to receiving such event data 525. Upon receiving the event data 525, the delivery management component 425 may determine whether the user and/or group of users should be notified that the requested content 515*b* is available for output.

The user and/or group of users (and more particularly the user and/or group profile data of the user and/or group of users) may be associated with one or more devices 110 configured to notify the user and/or group of users using one or more techniques. For example, the user and/or group of users may be associated with one or more devices 110 configured to notify the user, that the requested content 515*b* is available for output, by activating a light indicator (e.g., a light ring, light emitting diode (LED), etc.) in a particular manner (e.g., exhibit a particular color, blink in a particular manner, etc.); displaying a GUI element, such as a banner, card, or the like; vibrating in a particular manner (e.g., at a particular vibration strength, particular vibration pattern, etc.); and/or use some other mechanism. The delivery management component 425 may determine which device(s) 110 and which notification mechanism(s) should be used to notify the user and/or group of users of that the requested content 515*b* is available for output.

The delivery management component 425 may determine how to notify the user(s) of the requested content 515*b* based on device characteristics. The event data 525 may include the user and/or group identifier associated with the requested content 515*b* in the requested content storage 520. The delivery management component 425 may query the profile storage 770 for device characteristic data associated with one or more device identifiers associated with the user and/or group identifier. A given device 110's device characteristic data may represent, for example, whether the device 110 has a light(s) capable of indicating the requested content 515*b* is available for output, whether the device 110 includes or is otherwise in communication with a display capable of indicating the requested content 515*b* is available for output, and/or whether the device 110 includes a haptic component capable of indicating the requested content 515*b* is available for output.

The delivery management component 425 may indicate the requested content 515*b* is available for output based on the device characteristic data. For example, if the delivery management component 425 receives first device characteristic data representing a first device 110*a* includes a light(s), the delivery management component 425 may send, to the first device 110*a*, a first command 535*a* to activate the light(s) in a manner that indicates the requested content 515*b* is available for output. In some situations, two or more devices of the user and/or group of users may be capable of indicating the requested content 515*b* is available for output using lights of the two or more devices. In such situations, the delivery management component 425 may send, to each of the two or more devices, a command to cause the respective device's light(s) to indicate the requested content 515*b* is available for output.

The delivery management component 425 may additionally or alternatively receive second device characteristic data representing a second device 110*b* includes or is otherwise in communication with a display. In response to receiving the second device characteristic data, the delivery management component 425 may send, to the second device 110*b*, a second command 535*b* to display text, an image, a popup graphical element (e.g., a banner) that indicates the requested content 515*b* is available for output. For example, the displayed text may correspond to "you have an unread notification." But the text may not include specifics of the requested content 515*b*. An example of the second command 535*b* may be a mobile push command.

In some situations, two or more devices of the user and/or group of users may be capable of indicating the requested content 515*b* is available for output by displaying content. In such situations, the delivery management component 425 may send, to each of the two or more devices, a command to cause the respective device to display content indicating the requested content 515*b* is available for output.

The delivery management component 425 may additionally or alternatively receive third device characteristic data representing a third device 110*c* includes a haptic component. In response to receiving the device characteristic data, the delivery management component 425 may send, to the third device 110*c*, a third command 535*c* to vibrate in a manner that indicates the requested content 515*b* is available for output.

The delivery management component 425 may determine how to indicate the requested content 515*b* is available for output based on a user and/or group preference(s) corresponding to the user and/or group identifier associated with the requested content 515*b* in the requested content storage 520. For example, the delivery management component 425 may query the delivery preference component 415 for one or more indication preferences associated with the user and/or group identifier. An indication preference may indicate whether requested content is to be indicated using a light indicator, displayed content, vibration, and/or some other mechanism. An indication preference may indicate requested content, corresponding to a particular content topic, is to be indicated using a light indicator, displayed content, vibration, and/or some other mechanism.

The delivery management component 425 may additionally or alternatively determine how to indicate the requested content 515*b* is available for output based on a preference of the second content publisher 135*b* that provided the requested content 515*a*. For example, during offline operations, the second content publisher 135*b* may indicate requested content is to be indicated using a light indicator, displayed content, vibration, and/or some other mechanism. For further example, during offline operations, the second content publisher 135*b* may indicate requested content, corresponding to a particular content topic, is to be indicated using a light indicator, displayed content, vibration, and/or some other mechanism. In another example, the second content publisher 135*b* may indicate, at runtime, how the requested content 515*a* is to be indicated. For example, the requested content 515*a* may be associated with metadata representing how the requested content 515*a* is to be indicated to the user and/or group of users. The delivery management component 425 may query the delivery preference component 415 for one or more indication preferences associated with the identifier of the second content publisher 135*b*, and optionally the content topic associated with the requested content 515*a*.

In some situations, the delivery preference component 415 may determine and send, to the delivery management component 425, a user preference(s) and a content publisher preference(s) for indicating the requested content 515*b* is available for output. The delivery management component 425 may give priority to the user preference(s) in situations where the user preference(s) does not conform with the content publisher preference(s) (e.g., the user preference(s) indicates the requested content 515*b* is to be indicated using a light(s), but the content publisher preference(s) indicates the requested content 515*b* is to be indicated using displayed content).

In some situations, the delivery management component 425 may determine no device 110 of the user and/or group of users is capable of indicating the requested content 515*b* as preferred by either a user preference(s) or a content publisher preference(s). In such situations, the delivery management component 425 may cause the device(s) 110 of the user and/or group of users to indicate the requested content 515*b* according to characteristics of the device(s) 110.

In some situations, while the device(s) 110 is indicating the requested content 515*b* is available for output, the event bus 435 may receive additional requested content intended for the same user and/or group of users. Thus and in some embodiments, after receiving the event data 525, the delivery management component 425 may determine whether a device(s) 110 of the user and/or group of users is presently indicating the requested content 515*b* is available for output.

As part of the foregoing determination, the delivery management component 425 may determine a user and/or group identifier represented in the event data 525. If the event data 525 includes an encoded user and/or group identifier, the delivery management component 425 may perform one or more art-known/industry-known decoding techniques on the encoded user and/or group identifier to determine the corresponding user and/or group identifier. If the event data 525 includes a unique identifier as described previously, the delivery management component 425 may use a table (including unique identifiers associated with respective user and/or group identifiers) to determine the unique identifier is associated with a particular user and/or group identifier.

After receiving or determining the user and/or group identifier, the delivery management component 425 may determine one or more device identifiers (e.g., device serial numbers) associated with the user and/or group identifier. In other words, the delivery management component 425 determines one or more device identifiers corresponding to one or more devices 110 registered to a user and/or group of users corresponding to the user and/or group identifier.

Thereafter, the delivery management component 425 may determine whether at least one of the one or more device identifiers is associated with data (e.g., a flag or other indicator) representing a device(s) 110 is presently indicating requested content is available for output. If the delivery management component 425 determines a device(s) 110 is presently indicating requested content is available for output, the delivery management component 425 may cease processing with respect to the event data 525 (and not send an additional command(s) to the device(s) 110). Conversely, if the delivery management component 425 determines no devices 110 of the user and/or group of users are presently indicating requested content is available for output, the delivery management component 425 may determine how the requested content 515b is to be indicated to the user and/or group of users (as described herein above).

Figure 6:
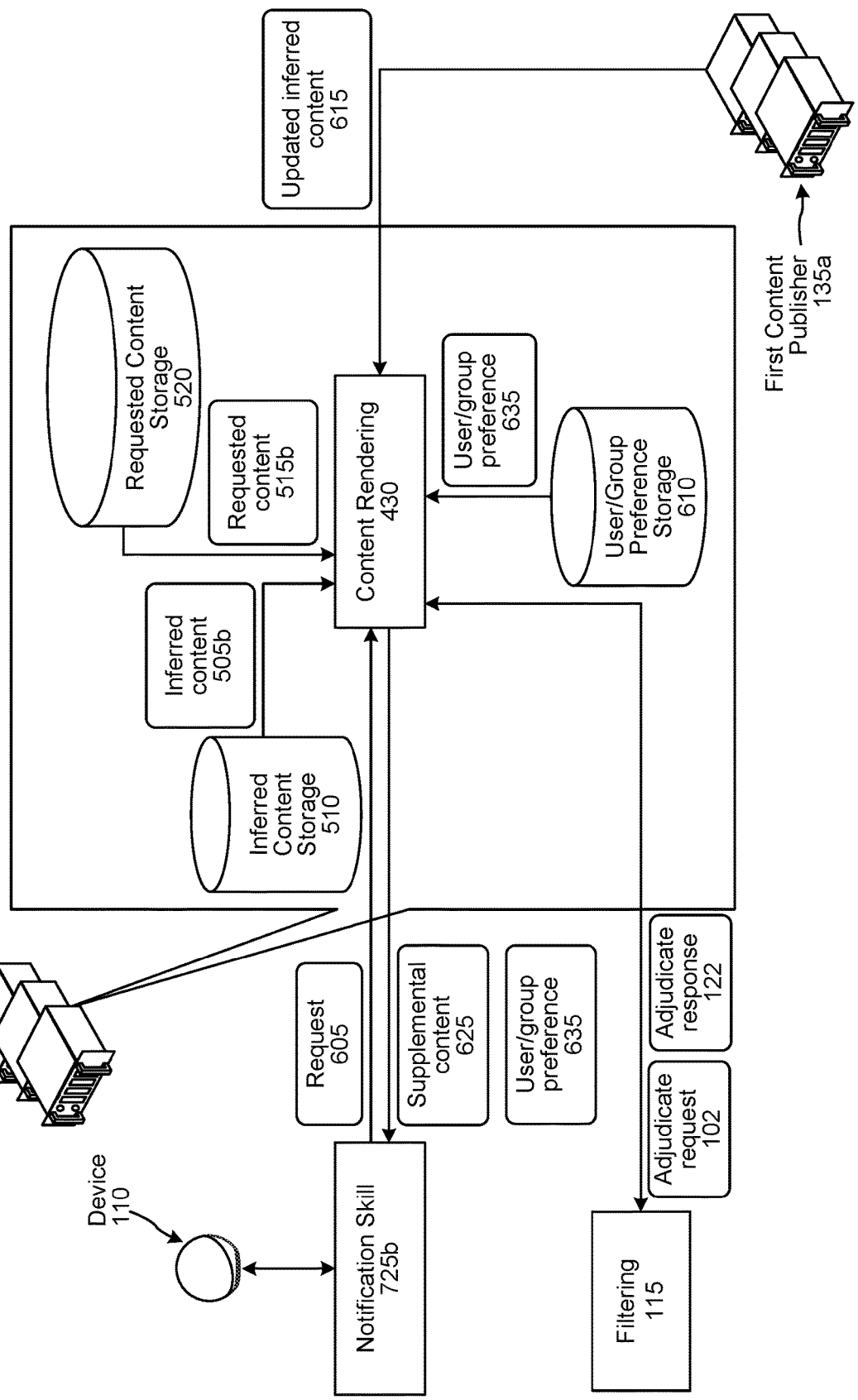
FIG. 6 is a conceptual diagram of components for outputting requested and inferred content using the notification system, according to embodiments of the present disclosure.

Referring to FIG. 6, sometime while the at least one device 110 of the user and/or group of users is indicating the requested content 515b is available for output, a device 110 of the user and/or group of users may receive a user input to output supplemental content(s) of the user and/or group of users. For example, the device 110 may receive audio corresponding to a spoken natural language user input to output supplemental content(s). An example of such a spoken natural language user input may be "what are my notifications," "output my notifications," and the like. For further example, the device 110 may receive a textual (e.g., typed) natural language user input to output supplemental content(s). In another example, the device 110 may include or otherwise be associated with a camera that captures a sequence of images representing the user 5 performing a gesture (an example of a user input) to output supplemental content(s). In a further example, the device 110 may include a button or display a virtual button (or other graphical user interface (GUI) element capable of being interacted with by the user 5), and the device 110 may detect the user 5 interacting with the button or other GUI element (an example of a user input) to output supplemental content(s).

In some embodiments, the device 110 may send data, representing the user input, to the system 120 for processing. In some instances, the device 110 may be configured to communicate with (i.e., send data to and received data from) the system 120 via an application installed on the device 110 and associated with the system 120. Such an application may be referred to as a companion application. An example of such an application is the Amazon Alexa application that may be installed on a smart phone or tablet.

The device 110 and/or system 120 (depending on the components illustrated in FIGS. 8-9 being implemented) processes data representing the user input (e.g., audio data representing a spoken natural language user input, text data representing a text-based natural language user input, data representing a performed gesture, data representing a button interaction, etc.) to determine skill input data (e.g., NLU output data) representing the user input requests supplemental content(s) be output, and including a user and/or group identifier associated with the device 110 (that captured the user input) and/or user 5 (that provided the user input). In response, the device 110/system 120 may send the skill input data to a notification skill 725b.

The notification skill 725b processes the skill input data to determine the skill input data represents supplemental content(s) is to be output, and includes the user and/or group identifier. In response to such processing, the notification skill 725b generates request data 605 including the user and/or group identifier and requesting supplemental content(s) associated with the user and/or group identifier. The notification skill 725b sends the request data 605 to the content rendering component 430 of the notification system 400.

In response to receiving the request data 605, the content rendering component 430 queries the requested content storage 520 for requested content associated with the user and/or group identifier represented in the request data 605. In response, the content rendering component 430 receives at least the requested content 515b. Moreover, in response to receiving the request data 605, the content rendering component 430 queries the inferred content storage 510 for inferred content associated with the user and/or group identifier represented in the request data 605. In response, the content rendering component 430 receives at least the inferred content 505b.

Since the inferred content 505b may not be output until after the user or group of users is notified of the requested content 515b, it will be appreciated that a duration of time may occur between when the notification system 400 stores the inferred content 505b in the inferred content storage 510 and when the notification skill 725b sends the request data 605 to the content rendering component 430. In some situations, the inferred content 505b may be outdated or otherwise need updating prior to being output. For example, if the inferred content 505b is a shopping recommendation that includes a number of available products, the inferred content 505b may need to be updated to reflect a number of available products at the time of output to the user and/or group of users.

In view of the foregoing, the content rendering component 430 may determine the inferred content 505b was received from the first content publisher 135a (e.g., based on an identifier of the first content publisher 135a being associated with the inferred content 505b in the inferred content storage 510). Thereafter, the content rendering component 430 may send an update content request to the first content publisher 135a. The update content request may include an identifier uniquely identifying the inferred content 505b to the first content publisher 135a. In some embodiments, this identifier may be represented in the metadata associated with the inferred content 505a/605b. In some embodiments, the content rendering component 430 may send the update content request via a serial peripheral interface (SPI). As such, if the content rendering component 430 receives multiple inferred contents from the inferred content storage 510, the content rendering component 430 may send a respective update content request to two or more different content publishers 135 via the SPI.

In response to receiving the update content request, the first content publisher 135a may determine the inferred content 505b as stored by the first content publisher 135a, and may generate updated inferred content 615 therefrom. In some embodiments, the updated inferred content 615 may be in a structured, non-natural language format. In some embodiments, the updated inferred content 615 may be in a natural language format. In some embodiments, the first content publisher 135a may perform art-known/industry-known natural language generation processing to generate the updated inferred content 615.

For example, if the inferred content 505b corresponds to "a deal just started for [product name]," the first content publisher 135a may determine (in response to receiving the update content request) that 85% of the product has been sold, and the updated inferred content 615 may be generated to correspond to "a deal for [product name] is 85% sold out"

or "a deal for [product name] is almost sold out." As such, it will be appreciated that the first content publisher 135a may generate the updated inferred content 615 based on information that became available to the first content publisher 135a after the first content publisher 135a sent the inferred content 505a to the notification system 400.

In some embodiments, in response to receiving the update content request, the first content publisher 135a may determine additional inferred content that became available after sending the inferred content 505a to the notification system 400. In such embodiments, the first content publisher 135a may perform natural language generation (or other) processing to generate the updated inferred content 615 to correspond to the inferred content 505b and the additional inferred content. For example, if the inferred content 505b is a shopping recommendation for a first product, the additional inferred content may be a shopping recommendation for a second product that became on sale after the inferred content 505a was originally sent to the notification system 400.

In some embodiments, the content rendering component 430 may determine a rating associated with a content publisher 135 (or other value representing the content publisher 135 will generate the updated inferred content 615 without including profanity or other adult-only content), and may only send the update content request to the content publisher 135 if the rating (or other value) satisfies a condition (e.g., meets or exceeds a threshold rating/value). Such processing configures the content rendering component 430 to only send an update content request to a content publisher 135 trusted by the content rendering component 430, as in some embodiments the content rendering component 430 may not be configured to check the updated inferred content 615 for profanity or other adult-only content. The rating or other value may be based at least in part on user feedback data received from users of the system 100 with respect to previous data generated by the content publisher 135.

In some embodiments, the first content publisher 135a may not generate the updated inferred content 615 in response to receiving the update content request (e.g., in situations wherein the first content publisher 135a is unaware of any updated or additional inferred content).

In some embodiments, rather than sending the inferred content 505a to the event bus 435, the first content publisher 135a may send, to the event bus 435, data indicating the first content publisher 135a wants inferred content to be output to the user or group of users. In such embodiments and in response to receiving the request data 605, the content rendering component 430 may query the first content publisher 135a for inferred content, and the first content publisher 135a may in turn send the updated inferred content 615 to the content rendering component 430.

The content rendering component 430 sends, to the notification skill 725b, supplemental content 625. In some embodiments, the supplemental content 625 may include at least the requested content 515b and the inferred content 505b (e.g., in the situation where the first content publisher 135a does not send the updated inferred content 615 to the content rendering component 430). In at least some embodiments, the supplemental content 625 may include at least the requested content 515b and the updated inferred content 615.

In at least some embodiments, the supplemental content 625 may only include the requested content 515b. For example, upon receiving the inferred content 505b or updated inferred content 615, the content rendering component 430 may send an adjudicate request 102, corresponding to the inferred content 505b or updated inferred content 615, to the filtering component 115. The filtering component 115 may then process as described herein to generate adjudicate response data 122 for the inferred content 505b or updated inferred content 615. If the adjudicate response data 122 indicates the inferred content 505b or updated inferred content 615 should not be output, the content rendering component 430 may, in response to receiving the adjudicate response data 122, not include the inferred content 505b or updated inferred content 615 in the supplemental content 625.

In some embodiments, the content rendering component 430 may only include the inferred content 505b, or updated inferred content 615, in the supplemental content 625 if the inferred content 505b, or updated inferred content 615, corresponds to a same content topic (or domain) as the requested content 515b.

Additionally, in response to receiving the request data 605, the content rendering component 430 may query a user/group preference storage 610 (which may be stored by the notification system 400) for user/group preference data 635 associated with the user and/or group identifier, and may send the user/group preference data 635 to the notification skill 725b. The user/group preference data 635 may represent one or more user/group preferences for ordering the output of supplemental contents. For example, a user/group preference may represent a certain content topic is to be output prior to any other content topic. For further example, a user/group preference may represent a first content topic is to be output prior to a second content topic.

The user/group preference data 635 may represent one or more user/group preferences regarding output of supplemental content on specific device types. For example, a user/group preference may represent inferred content is to be output using a specific device type, using a specific output type (e.g., synthesized speech, displayed content, etc.), and/or at a specific time of day.

Whereas the content rendering component 430 may be configured to send all data, required to output supplemental content, to the notification skill 725b, the notification skill 725b may be configured to construct the output to the user. The notification skill 725b may generate an ordering (of the supplemental contents) based on the user/group preference data 635 and/or one or more default ordering rules (which may order supplemental contents based on content topic (e.g., inferred v. requested, shopping v. system feature/functionality, sporting event score update v. new email, etc.)). In some embodiments, the notification skill 725b may implement a rules engine that processes the user/group preference data 635 and the default ordering rule(s) to determine the ordering. In some embodiments, the notification skill 725b may implement a heuristics-based algorithm (or other type of algorithm) that takes into consideration the user/group preference data 635 and the default ordering rule(s) for determining the ordering. In at least some embodiments, the notification skill 725b may implement a machine learning model that processes the user/group preference data 635 and the default ordering rule(s) to determine the ordering.

The notification skill 725b may determine how the supplemental contents should be output. For example, the notification skill 725b may determine the supplemental contents should be output as synthesized speech. For further example, the notification skill 725b may determine the supplemental contents should be displayed. In another example, the notification skill 725*b* may determine the supplemental contents should be both output as synthesized speech and displayed.

The notification skill 725*b* may determine the inferred content 505*b*, or the updated inferred content 615, should not be output based on how the supplemental contents are to be output. For example, the notification skill 725*b* may determine the user/group preference data 635 indicates a content topic is to be output using a specific mechanism (e.g., synthesized speech and/or displayed), may determine the inferred content 505*b* or updated inferred content 615 corresponds to the content topic, determine the supplemental contents are to be output using a mechanism other than the user/group preferred mechanism, and based thereon determine the inferred content 505*b* or updated inferred content 615 should not be output.

In some embodiments, the notification skill 725*b* may determine supplemental content to be output was received by the notification skill 725*b* in a structured, non-natural language format. In some embodiments, the notification skill 725*b* may use an art-known/industry-known template-based approach to generate natural language supplemental content corresponding to the structured, non-natural language supplemental content. In some embodiments, the notification skill 725*b* may use an art-known/industry-known natural language generation processing-based approach to generate natural language supplemental content corresponding to the structured, non-natural language supplemental content.

In embodiments where the notification skill 725*b* determines the supplemental contents are to be output as audio, the notification skill 725*b* may send a respective natural language representation of each supplemental content to be output to the TTS component 780, and the TTS component 780 may perform TTS processing on each instance of natural language supplemental content to generate different instances of audio data including synthesized speech corresponding to respective natural language supplemental content. The notification skill 725*b* may then cause the different audio data (corresponding to the different natural language synthesized speech of the different supplemental contents) to be sent to the device 110 (in situations wherein the notification skill 725*b* is not implemented by the device 110) and output by the device 110 in the order determined by the notification skill 725*b*. This may include the notification skill 725*b* causing order data to be sent to the device 110, with the order data representing the order determined by the notification skill 725*b*.

In some embodiments, the notification skill 725*b* may generate ordered natural language supplemental contents corresponding to the different instances of the natural language supplemental content in the order determined by the notification skill 725*b*. In such embodiments, the notification skill 725*b* may send the ordered natural language supplemental contents to the TTS component 780, and the TTS component 780 may perform TTS processing on the ordered natural language supplemental contents to generate a single instance of audio data including synthesized speech corresponding to the ordered natural language supplemental content. The notification skill 725*b* may then cause the audio data to output by the device 110.

Additionally or alternatively, the notification skill 725*b* may determine the natural language supplemental contents are to be displayed as natural language text. In such embodiments, the notification skill 725*b* may cause different instances of natural language text data (each corresponding to a different instance of natural language supplemental content) to be displayed by the device 110 (using a display of or otherwise associated with the device 110) in the order determined by the notification skill 725*b*. This may include the notification skill 725*b* causing order data to be sent to the device 110, with the order data representing the order determined by the notification skill 725*b*. In some embodiments, the notification skill 725*b* may send a single instance of natural language text data (corresponding to the ordered natural language supplemental contents) to be sent to the device 110 for output. In some embodiments, the device 110 may display natural language text (corresponding to different supplemental contents) in a list format.

In some embodiments, the notification skill 725*b* may cause one or more devices, associated with the same user and/or group profile data as the device 110 that captured the user input requesting supplemental content be output, to output the foregoing synthesized speech and/or display the foregoing natural language text.

Figure 7:
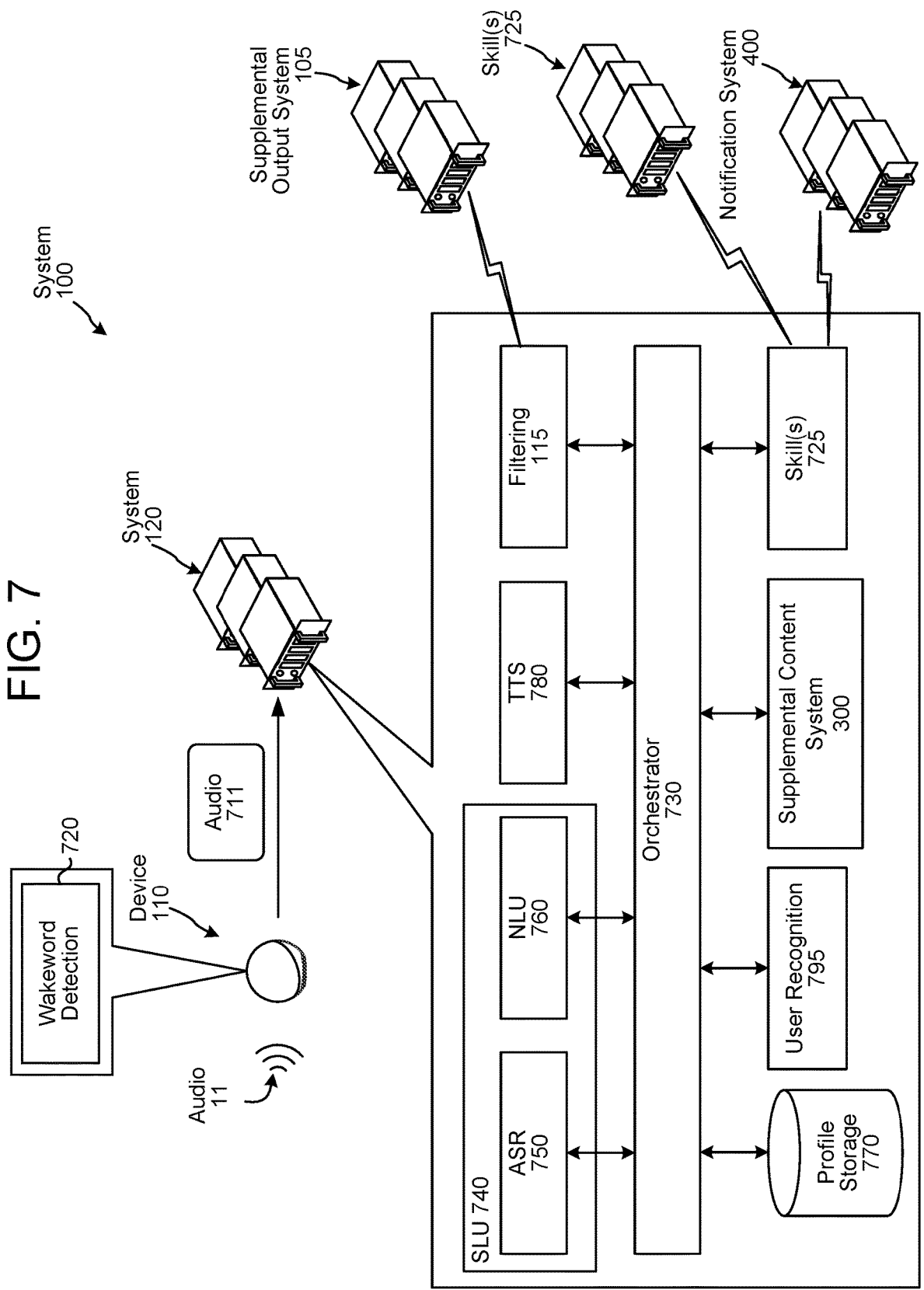
FIG. 7 is a conceptual diagram of components of a system, according to embodiments of the present disclosure.

The system 100 may operate using various components as illustrated in FIG. 7. The various components may be located on a same or different physical devices. Communication between various components may occur directly or across a network(s) 199.

A microphone or array of microphones (of or otherwise associated with the device 110) may capture audio 11. The device 110 processes audio data, representing the audio 11, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data, the energy levels of the audio data in one or more spectral bands, the signal-to-noise ratios of the audio data in one or more spectral bands, or other quantitative aspects. In other examples, the device 110 may implement a classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data, the device 110 may determine if the speech is directed at the device 110/system 120. In at least some embodiments, such determination may be made using a wakeword detection component 720. The wakeword detection component 720 may be configured to detect various wakewords. In at least some examples, each wakeword may correspond to a name of a different digital assistant. An example wakeword/digital assistant name is "Alexa."

Wakeword detection is typically performed without performing linguistic analysis, textual analysis, or semantic analysis. Instead, the audio data is analyzed to determine if specific characteristics of the audio data match preconfigured acoustic waveforms, audio signatures, or other data corresponding to a wakeword.

Thus, the wakeword detection component 720 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid deep neural network (DNN)-HMM decoding framework. In another example, the wakeword detection component 720 may be built on DNN/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword detection component 720 detects a wakeword, the device 110 may "wake" and begin transmitting audio data 711, representing the audio 11, to the system 120. The audio data 711 may include the detected wakeword, or the device 110 may remove the portion of the audio data, corresponding to the detected wakeword, prior to sending the audio data 711 to the system 120.

The system 120 may include an orchestrator component 730 configured to, among other things, coordinate data transmissions between components of the system 120. The orchestrator component 730 may receive the audio data 711 from the device 110, and send the audio data 711 to an ASR component 750.

The ASR component 750 transcribes the audio data 711 into ASR output data including one or more ASR hypotheses. An ASR hypothesis may be configured as a textual interpretation of the speech in the audio data 711, or may be configured in another manner, such as one or more tokens. Each ASR hypothesis may represent a different likely interpretation of the speech in the audio data 711. Each ASR hypothesis may be associated with a score (e.g., confidence score, probability score, or the like) representing the associated ASR hypothesis correctly represents the speech in the audio data 711.

The ASR component 750 interprets the speech in the audio data 711 based on a similarity between the audio data 711 and pre-established language models. For example, the ASR component 750 may compare the audio data 711 with models for sounds (e.g., subword units, such as phonemes, etc.) and sequences of sounds to identify words that match the sequence of sounds of the speech represented in the audio data 711.

In at least some instances, instead of the device 110 receiving a spoken natural language input, the device 110 may receive a textual (e.g., types) natural language input. The device 110 may determine text data representing the textual natural language input, and may send the text data to the system 120, wherein the text data is received by the orchestrator component 730. The orchestrator component 730 may send the text data or ASR output data, depending on the type of natural language input received, to a NLU component 760.

The NLU component 760 processes the ASR output data or text data to determine one or more NLU hypotheses embodied in NLU output data. The NLU component 760 may perform intent classification (IC) processing on the ASR output data or text data to determine an intent of the natural language input. An intent corresponds to an action to be performed that is responsive to the natural language input. To perform IC processing, the NLU component 760 may communicate with a database of words linked to intents. For example, a music intent database may link words and phrases such as "quiet," "volume off," and "mute" to a <Mute> intent. The NLU component 760 identifies intents by comparing words and phrases in ASR output data or text data to the words and phrases in an intents database. In some embodiments, the NLU component 760 may communicate with multiple intents databases, with each intents database corresponding to one or more intents associated with a particular skill.

For example, IC processing of the natural language input "play my workout playlist" may determine an intent of <PlayMusic>. For further example, IC processing of the natural language input "call mom" may determine an intent of <Call>. In another example, IC processing of the natural language input "call mom using video" may determine an intent of <VideoCall>. In yet another example, IC processing of the natural language input "what is today's weather" may determine an intent of <OutputWeather>.

The NLU component 760 may also perform named entity recognition (NER) processing on the ASR output data or text data to determine one or more portions, sometimes referred to as slots, of the natural language input that may be needed for post-NLU processing (e.g., processing performed by a skill). For example, NER processing of the natural language input "play [song name]" may determine an entity type of "SongName" and an entity value corresponding to the indicated song name. For further example, NER processing of the natural language input "call mom" may determine an entity type of "Recipient" and an entity value corresponding to "mom." In another example, NER processing of the natural language input "what is today's weather" may determine an entity type of "Date" and an entity value of "today."

In at least some embodiments, the intents identifiable by the NLU component 760 may be linked to one or more grammar frameworks with entity types to be populated with entity values. Each entity type of a grammar framework corresponds to a portion of ASR output data or text data that the NLU component 760 believes corresponds to an entity value. For example, a grammar framework corresponding to a <PlayMusic> intent may correspond to sentence structures such as "Play {Artist Name}," "Play {Album Name}," "Play {Song name}," "Play {Song name} by {Artist Name}," etc.

For example, the NLU component 760 may perform NER processing to identify words in ASR output data or text data as subject, object, verb, preposition, etc. based on grammar rules and/or models. Then, the NLU component 760 may perform IC processing using the identified verb to identify an intent. Thereafter, the NLU component 760 may again perform NER processing to determine a grammar model associated with the identified intent. For example, a grammar model for a <PlayMusic> intent may specify a list of entity types applicable to play the identified "object" and any object modifier (e.g., a prepositional phrase), such as {Artist Name}, {Album Name}, {Song name}, etc. The NER processing may then involve searching corresponding fields in a lexicon, attempting to match words and phrases in the ASR output data that NER processing previously tagged as a grammatical object or object modifier with those identified in the lexicon.

NER processing may include semantic tagging, which is the labeling of a word or combination of words according to their type/semantic meaning. NER processing may include parsing ASR output data or text data using heuristic grammar rules, or a model may be constructed using techniques such as hidden Markov models, maximum entropy models, log linear models, conditional random fields (CRFs), and the like. For example, NER processing with respect to a music skill may include parsing and tagging ASR output data or text data corresponding to "play mother's little helper by the rolling stones" as {Verb}: "Play," {Object}: "mother's little helper," {Object Preposition}: "by," and {Object Modifier}: "the rolling stones." The NER processing may identify "Play" as a verb based on a word database associated with the music skill, which IC processing determines corresponds to a <PlayMusic> intent.

The NLU component 760 may generate NLU output data including one or more NLU hypotheses, with each NLU hypothesis including an intent and optionally one or more entity types and corresponding entity values. In some embodiments, the NLU component 760 may perform IC processing and NER processing with respect to different skills. One skill may support the same or different intents than another skill. Thus, the NLU output data may include multiple NLU hypotheses, with each NLU hypothesis corresponding to IC processing and NER processing performed on the ASR output or text data with respect to a different skill.

As described above, the system 120 may perform speech processing using two different components (e.g., the ASR component 750 and the NLU component 760). In at least some embodiments, the system 120 may implement a spoken language understanding (SLU) component 740 configured to process audio data 711 to determine NLU output data.

The SLU component 740 may be equivalent to a combination of the ASR component 750 and the NLU component 760. Yet, the SLU component 740 may process audio data 711 and directly determine the NLU output data, without an intermediate step of generating ASR output data. As such, the SLU component 740 may take audio data 711 representing a spoken natural language input and attempt to make a semantic interpretation of the spoken natural language input. That is, the SLU component 740 may determine a meaning associated with the spoken natural language input and then implement that meaning. For example, the SLU component 740 may interpret audio data 711 representing a spoken natural language input in order to derive a desired action. The SLU component 740 may output a most likely NLU hypothesis, or multiple NLU hypotheses associated with respective confidence or other scores (such as probability scores, etc.).

The system 120 may include a gesture detection component (not illustrated in FIG. 7). The system 120 may receive image data representing a gesture, the gesture detection component may process the image data to determine a gesture represented therein. The gesture detection component may implement art-known/industry-known gesture detection processes.

In embodiments where the system 120 receives non-image data (e.g., text data) representing a gesture, the orchestrator component 730 may be configured to determine what downstream processing is to be performed in response to the gesture.

In embodiments where the system 120 data representing a selected GUI element, the orchestrator component 730 may be configured to determine what downstream processing is to be performed in response to the GUI element selection.

The system 120 may include or otherwise communicate with one or more skills 725. A "skill" may refer to software, that may be placed on a machine or a virtual machine (e.g., software that may be launched in a virtual instance when called), configured to process NLU output data and perform one or more actions in response thereto. For example, for NLU output data including a <PlayMusic> intent, an "artist" entity type, and an artist name as an entity value, a music skill may be called to output music sung by the indicated artist. For further example, for NLU output data including a <TurnOn> intent, a "device" entity type, and an entity value of "lights," a smart home skill may be called to cause one or more "smart" lights to operate in an "on" state. In another example, for NLU output data including an <OutputWeather> intent, a "location" entity type, and an entity value corresponding to a geographic location of the device 110, a weather skill may be called to output weather information for the geographic location. For further example, for NLU output data including a <BookRide> intent, a taxi skill may be called to book a requested ride. In another example, for NLU output data including a <BuyPizza> intent, a restaurant skill may be called to place an order for a pizza.

A skill 725 may operate in conjunction between the system 120 and other devices, such as the device 110, a restaurant electronic ordering system, a taxi electronic booking system, etc. in order to complete certain functions. Inputs to a skill 725 may come from speech processing interactions or through other interactions or input sources.

A skill 725 may be associated with a domain, a non-limiting list of which includes a smart home domain, a music domain, a video domain, a weather domain, a communications domain, a flash briefing domain, a shopping domain, and a custom domain.

The system 120 may include a TTS component 780 that generates audio data including synthesized speech. The data input to the TTS component 780 may come from a skill 725, the orchestrator component 730, or another component of the system 120.

In one method of synthesis called unit selection, the TTS component 780 matches input data against a database of recorded speech. The TTS component 780 selects matching units of recorded speech and concatenates the units together to form audio data. In another method of synthesis called parametric synthesis, the TTS component 780 varies parameters such as frequency, volume, and noise to determine audio data including an artificial speech waveform. Parametric synthesis uses a computerized voice generator, sometimes called a vocoder.

The system 120 may include a user recognition component 795. The user recognition component 795 may recognize one or more users using various data. The user recognition component 795 may take as input the audio data 711. The user recognition component 795 may perform user recognition by comparing speech characteristics, in the audio data 711, to stored speech characteristics of users. The user recognition component 795 may additionally or alternatively perform user recognition by comparing biometric data (e.g., fingerprint data, iris data, retina data, etc.), received by the system 120 in correlation with a natural language input, to stored biometric data of users. The user recognition component 795 may additionally or alternatively perform user recognition by comparing image data (e.g., including a representation of at least a feature of a user), received by the system 120 in correlation with a natural language input, with stored image data including representations of features of different users. The user recognition component 795 may perform other or additional user recognition processes, including those known in the art. For a particular natural language input, the user recognition component 795 may perform processing with respect to stored data of users associated with the device 110 that received the natural language input.

The user recognition component 795 determines whether a natural language input originated from a particular user. For example, the user recognition component 795 may determine a first value representing a likelihood that a natural language input originated from a first user, a second value representing a likelihood that the natural language input originated from a second user, etc. The user recognition component 795 may also determine an overall confidence regarding the accuracy of user recognition processing.

The user recognition component 795 may output a single user identifier corresponding to the most likely user that originated the natural language input. Alternatively, the user recognition component 795 may output multiple user identifiers (e.g., in the form of an N-best list) with respective values representing likelihoods of respective users originating the natural language input. The output of the user recognition component 795 may be used to inform NLU processing, processing performed by a skill 725, as well as processing performed by other components of the system 120 and/or other systems.

The system 120 may include profile storage 770. The profile storage 770 may include a variety of data related to individual users, groups of users, devices, etc. that interact with the system 120. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; skill enablement data; and/or other data.

The profile storage 770 may include one or more user profiles. Each user profile may be associated with a different user identifier. Each user profile may include various user identifying data (e.g., name, gender, address, language(s), etc.). Each user profile may also include preferences of the user. Each user profile may include one or more device identifiers, each representing a respective device registered to the user. Each user profile may include skill identifiers of skills 725 that the user has enabled. When a user enables a skill 725, the user is providing the system 120 with permission to allow the skill 725 to execute with respect to the user's natural language inputs. If a user does not enable a skill 725, the system 120 may not execute the skill 725 with respect to the user's natural language inputs.

The profile storage 770 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may be associated with (or include) one or more device profiles corresponding to one or more devices associated with the group profile.

The profile storage 770 may include one or more device profiles. Each device profile may be associated with a different device identifier. A device profile may include various device identifying data, input/output characteristics, networking characteristics, etc. A device profile may also include one or more user identifiers, corresponding to one or more user profiles associated with the device profile. For example, a household device's profile may include the user identifiers of users of the household.

The system 120 includes the filtering component 115 and the supplemental content system 300. The system 120 may communicate with the notification system 400 via a skill 725.

Figure 8:
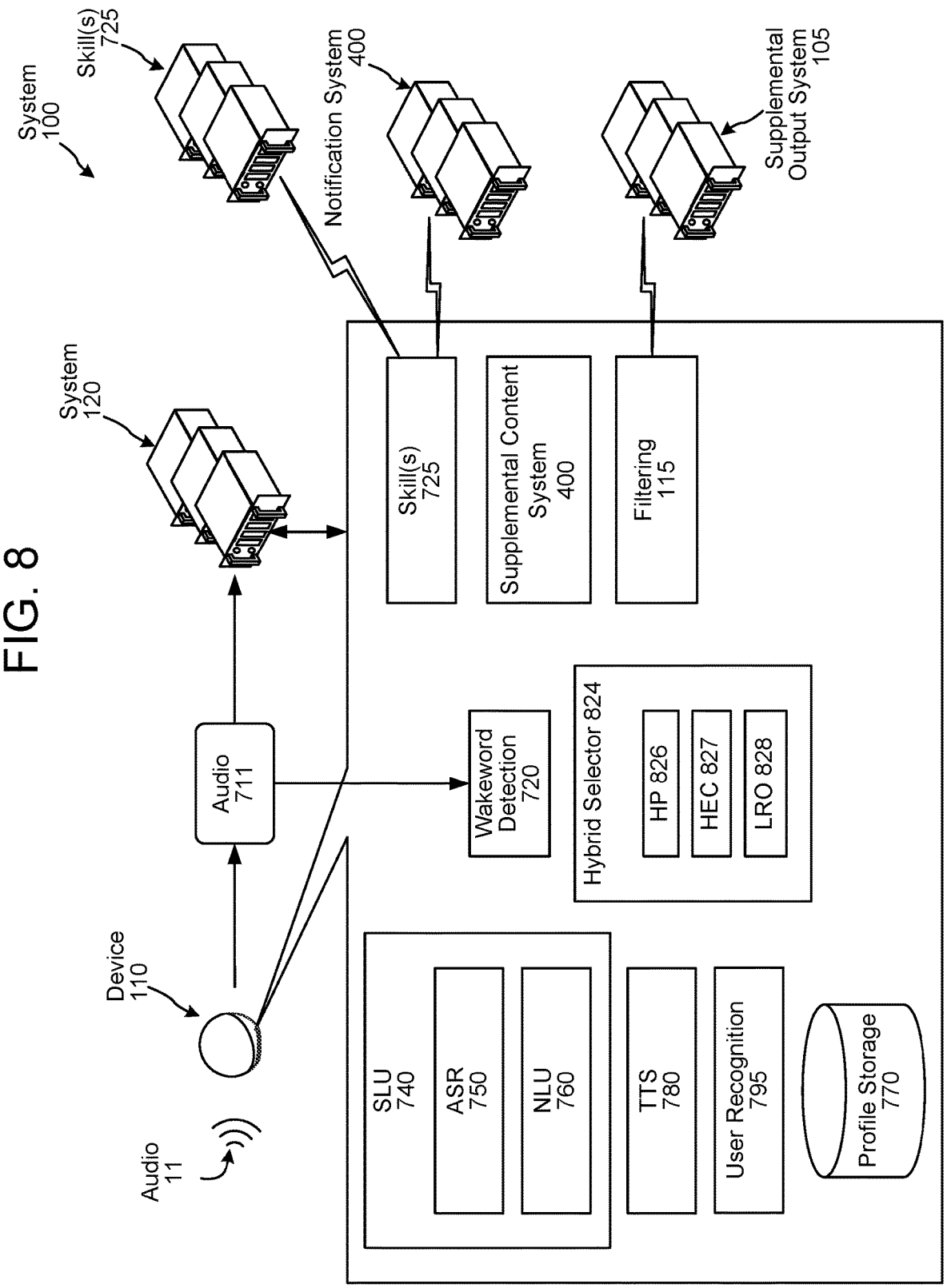
FIG. 8 is a conceptual diagram illustrating components that may be included in a device, according to embodiments of the present disclosure.

The foregoing describes illustrative components and processing of the system 120. The following describes illustrative components and processing of the device 110. As illustrated in FIG. 8, in at least some embodiments the system 120 may receive the audio data 711 from the device 110, to recognize speech corresponding to a spoken natural language in the received audio data 711, and to perform functions in response to the recognized speech. In at least some embodiments, these functions involve sending directives (e.g., commands), from the system 120 to the device 110 to cause the device 110 to perform an action, such as output synthesized speech (responsive to the spoken natural language input) via a loudspeaker(s), and/or control one or more secondary devices by sending control commands to the one or more secondary devices.

Thus, when the device 110 is able to communicate with the system 120 over the network(s) 199, some or all of the functions capable of being performed by the system 120 may be performed by sending one or more directives over the network(s) 199 to the device 110, which, in turn, may process the directive(s) and perform one or more corresponding actions. For example, the system 120, using a remote directive that is included in response data (e.g., a remote response), may instruct the device 110 to output synthesized speech via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It will be appreciated that the system 120 may be configured to provide other functions in addition to those discussed herein, such as, without limitation, providing step-by-step directions for navigating from an origin location to a destination location, conducting an electronic commerce transaction on behalf of the user 5 as part of a shopping function, establishing a communication session (e.g., an audio or video call) between the user 5 and another user, and so on.

As noted with respect to FIG. 7, the device 110 may include a wakeword detection component 720 configured to used to detect a wakeword (e.g., "Alexa") that indicates to the device 110 that the audio data 711 is to be processed for determining NLU output data. In at least some embodiments, a hybrid selector 824, of the device 110, may send the audio data 711 to the wakeword detection component 720. If the wakeword detection component 720 detects a wakeword in the audio data 711, the wakeword detection component 720 may send an indication of such detection to the hybrid selector 824. In response to receiving the indication, the hybrid selector 824 may send the audio data 711 to the system 120 and/or an on-device ASR component 750. The wakeword detection component 720 may also send an indication, to the hybrid selector 824, representing a wakeword was not detected. In response to receiving such an indication, the hybrid selector 824 may refrain from sending the audio data 711 to the system 120, and may prevent the on-device ASR component 750 from processing the audio data 711. In this situation, the audio data 711 can be discarded.

The device 110 may conduct its own speech processing using on-device language processing components (such as an on-device SLU component 740, an on-device ASR component 750, and/or an on-device NLU component 760) similar to the manner discussed above with respect to the system-implemented SLU component 740, ASR component 750, and NLU component 760. The device 110 may also internally include, or otherwise have access to, other components such as one or more skills 725, a user recognition component 795 (configured to process in a similar manner to the system-implemented user recognition component 795), profile storage 770 (configured to store similar profile data to the system-implemented profile storage 770), a gesture detection component (similar to that of the system 120 described above), the supplemental content system 300, the filtering component 115, and other components. In at least some embodiments, the on-device profile storage 770 may only store profile data for a user or group of users specifically associated with the device 110. The device 110 may communicate with the notification system 400, for example via a skill 725 implemented by the device 110.

In at least some embodiments, the on-device language processing components may not have the same capabilities as the language processing components implemented by the system 120. For example, the on-device language processing components may be configured to handle only a subset of the natural language inputs that may be handled by the system-implemented language processing components. For example, such subset of natural language inputs may correspond to local-type natural language inputs, such as those controlling devices or components associated with a user's home. In such circumstances the on-device language processing components may be able to more quickly interpret and respond to a local-type natural language input, for example, than processing that involves the system 120. If the device 110 attempts to process a natural language input for which the on-device language processing components are not necessarily best suited, the NLU output data, determined by the on-device components, may have a low confidence or other metric indicating that the processing by the on-device language processing components may not be as accurate as the processing done by the system 120.

The hybrid selector 824, of the device 110, may include a hybrid proxy (HP) 826 configured to proxy traffic to/from the system 120. For example, the HP 826 may be configured to send messages to/from a hybrid execution controller (HEC) 827 of the hybrid selector 824. For example, command/directive data received from the system 120 can be sent to the HEC 827 using the HP 826. The HP 826 may also be configured to allow the audio data 711 to pass to the system 120 while also receiving (e.g., intercepting) this audio data 711 and sending the audio data 711 to the HEC 827.

In at least some embodiments, the hybrid selector 824 may further include a local request orchestrator (LRO) 828 configured to notify the on-device ASR component 750 about the availability of the audio data 711, and to otherwise initiate the operations of on-device language processing when the audio data 711 becomes available. In general, the hybrid selector 824 may control execution of on-device language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system 120 and chooses to use that remotely-determined directive data.

Thus, when the audio data 711 is received, the HP 826 may allow the audio data 711 to pass through to the system 120 and the HP 826 may also input the audio data 711 to the on-device ASR component 750 by routing the audio data 711 through the HEC 827 of the hybrid selector 824, whereby the LRO 828 notifies the on-device ASR component 750 of the audio data 711. At this point, the hybrid selector 824 may wait for response data from either or both the system 120 and/or the on-device language processing components. However, the disclosure is not limited thereto, and in some examples the hybrid selector 824 may send the audio data 711 only to the on-device ASR component 750 without departing from the disclosure. For example, the device 110 may process the audio data 711 on-device without sending the audio data 711 to the system 120.

The on-device ASR component 750 is configured to receive the audio data 711 from the hybrid selector 824, and to recognize speech in the audio data 711, and the on-device NLU component 760 is configured to determine an intent from the recognized speech (an optionally one or more named entities), and to determine how to act on the intent by generating NLU output data that may include directive data (e.g., instructing a component to perform an action). In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

A NLU hypothesis (output by the on-device NLU component 760) may be selected as usable to respond to a natural language input, and local response data may be sent (e.g., local NLU output data, local knowledge base information, internet search results, and/or local directive data) to the hybrid selector 824, such as a "ReadyToExecute" response. The hybrid selector 824 may then determine whether to use directive data from the on-device components to respond to the natural language input, to use directive data received from the system 120, assuming a remote response is even received (e.g., when the device 110 is able to access the system 120 over the network(s) 199), or to determine output data requesting additional information from the user 5.

The device 110 and/or the system 120 may associate a unique identifier with each natural language input. The device 110 may include the unique identifier when sending the audio data 711 to the system 120, and the response data from the system 120 may include the unique identifier to identify to which natural language input the response data corresponds.

In at least some embodiments, the device 110 may include one or more skills 725 that may process similarly to the system-implemented skill(s) 725. The skill(s) 725 installed on (or in communication with) the device 110 may include, without limitation, a smart home skill and/or a device control skill configured to control a second device(s), a music skill configured to output music, a navigation skill configured to output directions, a shopping skill configured to conduct an electronic purchase, and/or the like.

Figure 9:
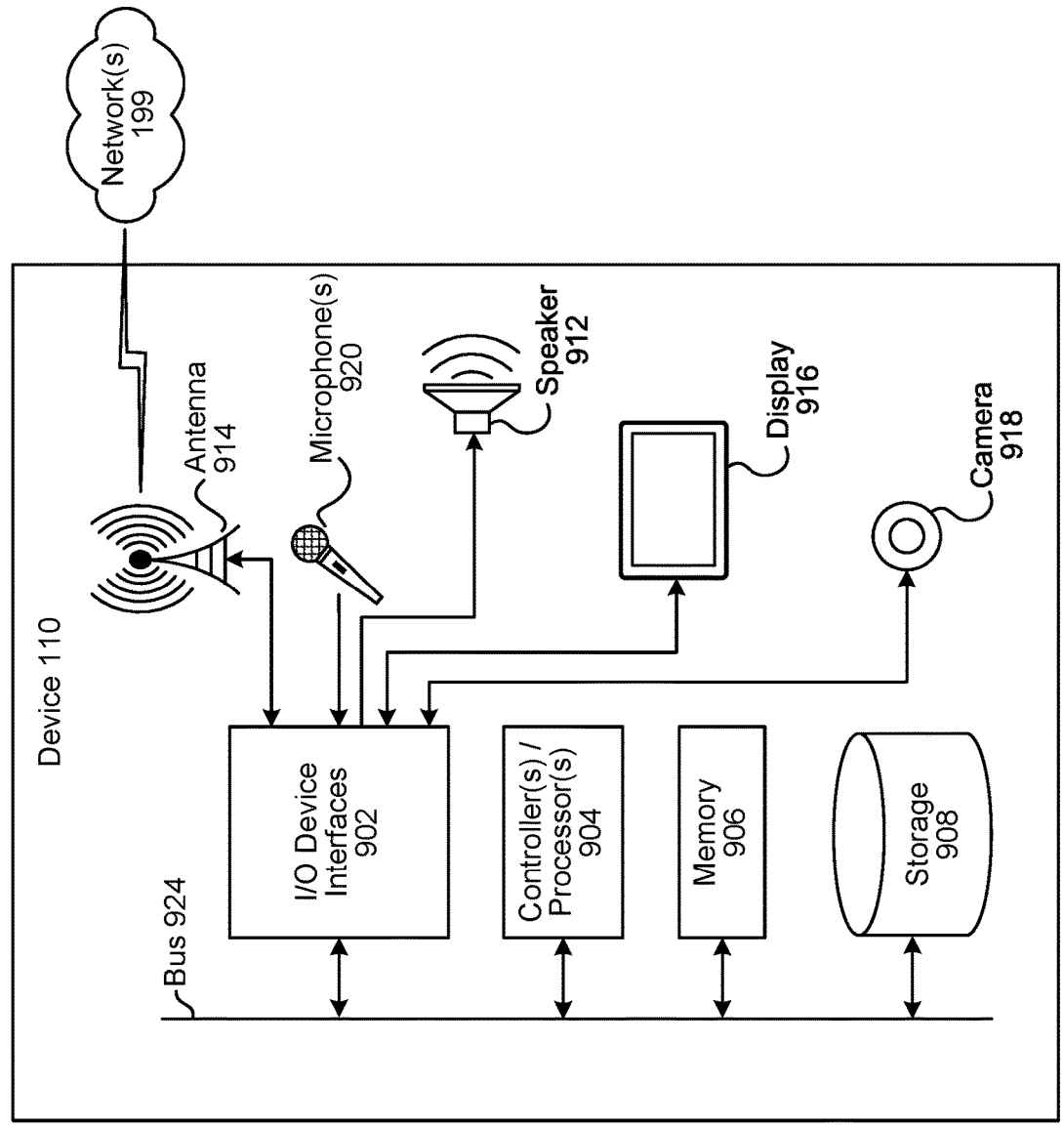
FIG. 9 is a block diagram conceptually illustrating example components of a device, according to embodiments of the present disclosure.
Figure 10:
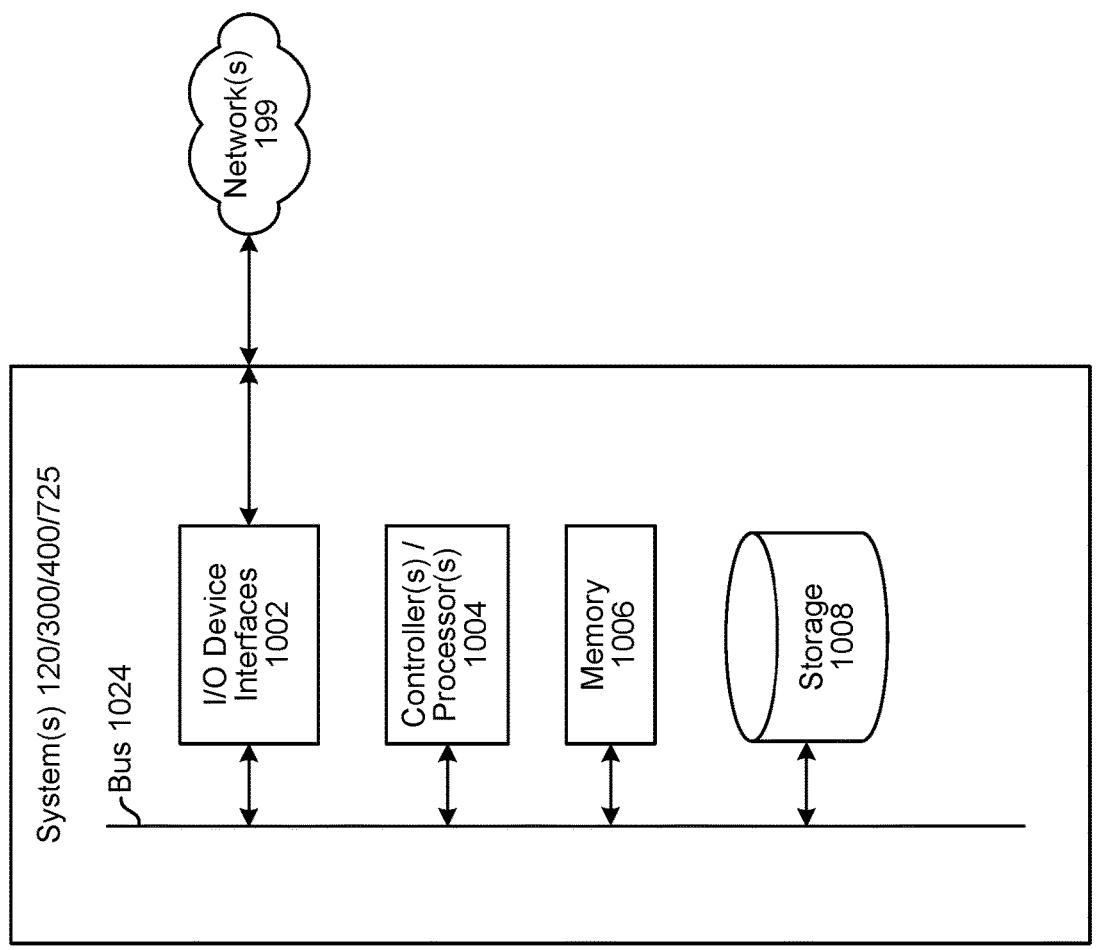
FIG. 10 is a block diagram conceptually illustrating example components of a system, according to embodiments of the present disclosure.

FIG. 9 is a block diagram conceptually illustrating a device 110 that may be used with the system 120. FIG. 10 is a block diagram conceptually illustrating example components of a remote device, such as the system 120 or a skill 725. A system (120/300/400/725) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system (120/300/400/725) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/300/400/725) may be included in the system 100 of the present disclosure, such as one or more systems 120 and/or one or more skills 725. In operation, each of these systems may include computer-readable and computer-executable instructions that reside on the respective device (120/300/400/725), as will be discussed further below.

Each of these devices (110/120/300/400/725) may include one or more controllers/processors (904/1004), which may each include a central processing unit (CPU) for processing data and computer-readable instructions, and a memory (906/1006) for storing data and instructions of the respective device. The memories (906/1006) may individually include volatile random access memory (RAM), non-volatile read only memory (ROM), non-volatile magnetoresistive memory (MRAM), and/or other types of memory. Each device (110/120/300/400/725) may also include a data storage component (908/1008) for storing data and controller/processor-executable instructions. Each data storage component (908/1008) may individually include one or more non-volatile storage types such as magnetic storage, optical storage, solid-state storage, etc. Each device (110/120/300/400/725) may also be connected to removable or external non-volatile memory and/or storage (such as a removable memory card, memory key drive, networked storage, etc.) through respective input/output device interfaces (902/1002).

Computer instructions for operating each device (110/120/300/400/725) and its various components may be executed by the respective device's controller(s)/processor(s) (904/1004), using the memory (906/1006) as temporary "working" storage at runtime. A device's computer instructions may be stored in a non-transitory manner in non-volatile memory (906/1006), storage (908/1008), or an external device(s). Alternatively, some or all of the executable instructions may be embedded in hardware or firmware on the respective device in addition to or instead of software.

Each device (110/120/300/400/725) includes input/output device interfaces (902/1002). A variety of components may be connected through the input/output device interfaces (902/1002), as will be discussed further below. Additionally, each device (110/120/300/725) may include an address/data bus (924/1024) for conveying data among components of the respective device. Each component within a device (110/120/300/400/725) may also be directly connected to other components in addition to (or instead of) being connected to other components across the bus (924/1024).

Referring to FIG. 9, the device 110 may include input/output device interfaces 902 that connect to a variety of components such as an audio output component such as a speaker 912, a wired headset or a wireless headset (not illustrated), or other component capable of outputting audio. The device 110 may also include an audio capture component. The audio capture component may be, for example, a microphone 920 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 916 for displaying content. The device 110 may further include a camera 918.

Via antenna(s) 914, the input/output device interfaces 902 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (902/1002) may also include communication components that allow data to be exchanged between devices such as different physical servers in a collection of servers or other components.

The components of the device 110, the system 120, the skill 725, and/or the notification system 400 may include their own dedicated processors, memory, and/or storage. Alternatively, one or more of the components of the device 110, the system 120, the skill 725, and/or the notification system 400 may utilize the I/O interfaces (902/1002), processor(s) (904/1004), memory (906/1006), and/or storage (908/1008) of the device 110, the system 120, the skill 725, or the notification system 400, respectively. Thus, the ASR component 750 may have its own I/O interface(s), processor(s), memory, and/or storage; the NLU component 760 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system 120, the skill 725, and the notification system 400, as described herein, are illustrative, and may be located as a stand-alone device or may be included, in whole or in part, as a component of a larger device or system.

Figure 11:
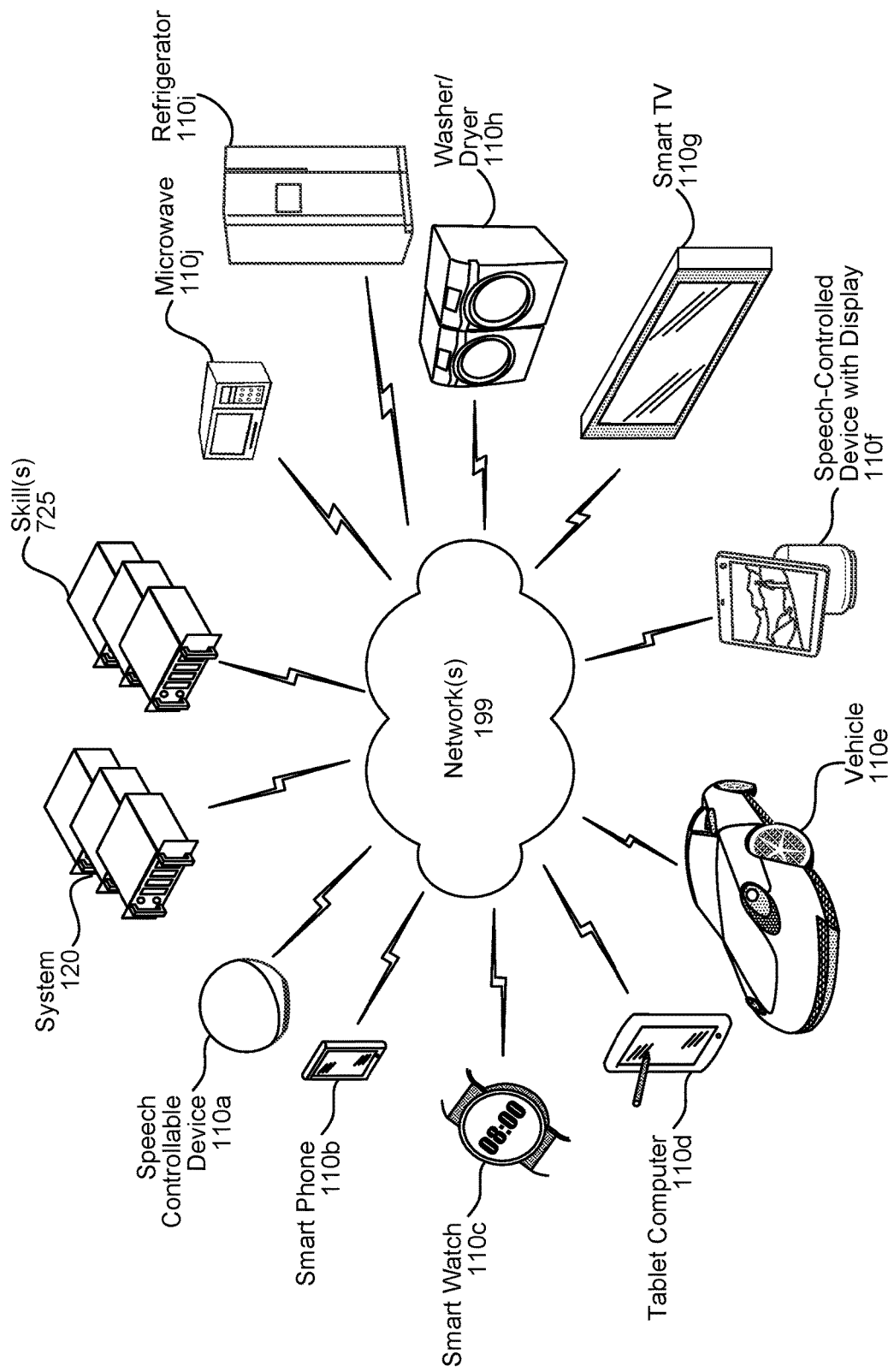
FIG. 11 illustrates an example of a computer network for use with the overall system, according to embodiments of the present disclosure.

As illustrated in FIG. 11, multiple devices (110*a*-110*j*, 120, 725) may contain components of the system and the devices may be connected over a network(s) 199. The network(s) 199 may include a local or private network or may include a wide network such as the Internet. Devices may be connected to the network(s) 199 through either wired or wireless connections. For example, a speech-controllable device 110*a*, a smart phone 110*b*, a smart watch 110*c*, a tablet computer 110*d*, a vehicle 110*e*, a speech-controllable display device 110*f*, a smart television 110*g*, a washer/dryer 110*h*, a refrigerator 110*i*, and/or a microwave 110*j* may be connected to the network(s) 199 through a wireless service provider, over a Wi-Fi or cellular network connection, or the like. Other devices are included as network-connected support devices, such as the system 120, the skill 725, and/or others. The support devices may connect to the network(s) 199 through a wired connection or wireless connection.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
    receiving, by a computing system and from a first content provider via a network, first data representing first content and a user identifier corresponding to an intended recipient of the first content;
    processing the first data to determine whether to cause a device associated with the user identifier to output the first content, the processing including:
        using a machine learning (ML) model to classify the first data as corresponding to a first topic of a plurality of topics, and
        determining that the first topic is represented in second data associated with the user identifier;
    receiving input data representing a user input to the device;
    determining, by the computing system, response data representing an output to be provided by the device in response the user input, wherein the computing system refrains from including the first content in the response data based at least in part on the first data being classified as corresponding to the first topic and the first topic being represented in the second data; and
    sending the response data to the device to cause the device to provide the output.

2. The computer-implemented method of claim 1, further comprising:
    determining a metric representing a trustworthiness of the first content provider; and
    determining, based at least in part on the metric, to process the first data to determine whether to cause the device to output the first content.

3. The computer-implemented method of claim 1, further comprising:
    receiving, by the computing system and from a second content provider via the network, third data representing second content and the user identifier;
    processing the third data to determine whether to cause the device to output the second content, the processing including:
        using the ML model to classify the third data as corresponding to a second topic of the plurality of topics, the second topic being different than the first topic, and determining that the second topic is unrepresented in the second data; and based at least in part on the third data being classified as corresponding to the second topic and the second topic being unrepresented in the second data, including at least a portion of the second content in the response data.

4. The computer-implemented method of claim 1, further comprising:
receiving user feedback data associated with the user identifier;
determining, in the user feedback data, a number of negative user feedback events associated with the first topic; and
generating the second data based at least in part on the number of negative user feedback events.

5. The computer-implemented method of claim 1, further comprising:
receiving user feedback data associated with the user identifier;
determining, in the user feedback data, a number of negative user feedback events associated with a system identifier corresponding to the first content provider; and
generating the second data based at least in part on the number of negative user feedback events.

6. The computer-implemented method of claim 1, further comprising:
receiving, from the first content provider, third data indicating the first data is associated with a second topic different than the first topic.

7. The computer-implemented method of claim 1, further comprising:
receiving, by the computing system and from the first content provider via the network, third data representing second content and the user identifier;
processing the third data to determine whether to cause the device to output the second content, the processing including:
using the ML model to classify the third data as corresponding to a second topic of the plurality of topics, the second topic being different than the first topic, and
determining that the second topic is unrepresented in the second data; and
based at least in part on the third data being classified as corresponding to the second topic and the second topic being unrepresented in the second data, including at least a portion of the second content in the response data.

8. The computer-implemented method of claim 1, wherein the input data represents a request for the device to output second content different from the first content.

9. The computer-implemented method of claim 1, wherein the input data represents a request for the device to output notifications associated with the user identifier.

10. The computer-implemented method of claim 9, wherein:
the computing system receives the first data after receiving the input data.

11. A computing system, comprising:
at least one processor; and
at least one memory comprising instructions that, when executed by the at least one processor, cause the computing system to:
receive, from a first content provider via a network, first data representing first content and a user identifier corresponding to an intended recipient of the first content;
process the first data, to determine whether to cause a device associated with the user identifier to output the first content, at least in part by:
using a machine learning (ML) model to classify the first data as corresponding to a first topic of a plurality of topics, and
determining that the first topic is represented in second data associated with the user identifier;
receive input data representing a user input to the device;
determine response data representing an output to be provided by the device in response to the user input, wherein the computing system refrains from including the first content in the response data based at least in part on the first data being classified as corresponding to the first topic and the first topic being represented in the second data; and
send the response data to the device to cause the device to provide the output.

12. The computing system of claim 11, wherein the at least one memory further comprises additional instructions that, when executed by the at least one processor, further cause the computing system to:
determine a metric representing a trustworthiness of the first content provider; and
determine, based at least in part on the metric, to process the first data to determine whether to cause the device to output the first content.

13. The computing system of claim 11, wherein the at least one memory further comprises additional instructions that, when executed by the at least one processor, further cause the computing system to:
receive, from a second content provider via the network, third data representing second content and the user identifier;
process the third data, to determine whether to cause the device to output the second content, at least in part by:
using the ML model to classify the third data as corresponding to a second topic of the plurality of topics, the second topic being different than the first topic, and
determining that the second topic is unrepresented in the second data; and
based at least in part on the third data being classified as corresponding to the second topic and the second topic being unrepresented in the second data, including at least a portion of the second content in the response data.

14. The computing system of claim 11, wherein the at least one memory further comprises additional instructions that, when executed by the at least one processor, further cause the computing system to:
receive user feedback data associated with the user identifier;
determine, in the user feedback data, a number of negative user feedback events associated with the first topic; and
generate the second data based at least in part on the number of negative user feedback events.

15. The computing system of claim 11, wherein the at least one memory further comprises additional instructions that, when executed by the at least one processor, further cause the computing system to:

receive user feedback data associated with the user identifier;

determine, in the user feedback data, a number of negative user feedback events associated with a system identifier corresponding to the first content provider; and generate the second data based at least in part on the number of negative user feedback events.

16. The computing system of claim 11, wherein the at least one memory further comprises additional instructions that, when executed by the at least one processor, further cause the computing system to:

receive, from the first content provider, third data indicating the first data is associated with a second topic different than the first topic.

17. The computing system of claim 11, wherein the at least one memory further comprises additional instructions that, when executed by the at least one processor, further cause the computing system to:

receive, from the first content provider via the network, third data representing second content and the user identifier;

process the third data, to determine whether to cause the device to output the second content, at least in part by:

using the ML model to classify the third data as corresponding to a second topic of the plurality of topics, the second topic being different than the first topic, and determining that the second topic is unrepresented in the second data; and based at least in part on the third data being classified as corresponding to the second topic and the second topic being unrepresented in the second data, include at least a portion of the second content in the response data.

18. The computing system of claim 11, wherein the input data represents a request for the device to output second content different from the first content.

19. The computing system of claim 11, wherein the input data represents a request for the device to output notifications associated with the user identifier.

20. The computing system of claim 19, wherein the at least one memory further comprises additional instructions that, when executed by the at least one processor, further cause the computing system to:

receive the first data after receiving the input data.

* * * * *